(12) United States Patent
McGraner et al.

(10) Patent No.: US 11,333,232 B2
(45) Date of Patent: May 17, 2022

(54) EDDY CURRENT SENSOR ASSEMBLY

(71) Applicant: Dana Automotive Systems Group, LLC, Maumee, OH (US)

(72) Inventors: Terry W. McGraner, Toledo, OH (US); Perry M. Paielli, Sand Creek, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 16/814,851

(22) Filed: Mar. 10, 2020

(65) Prior Publication Data

US 2020/0292356 A1   Sep. 17, 2020

Related U.S. Application Data

(60) Provisional application No. 62/818,522, filed on Mar. 14, 2019.

(51) Int. Cl.
| | | |
|---|---|---|
| *F16H 48/24* | (2006.01) | |
| *F16H 48/34* | (2012.01) | |
| *F16H 48/20* | (2012.01) | |
| *G01B 7/14* | (2006.01) | |
| *F16D 27/09* | (2006.01) | |

(52) U.S. Cl.
CPC ............. *F16H 48/24* (2013.01); *F16H 48/34* (2013.01); *F16D 27/09* (2013.01); *F16H 2048/204* (2013.01); *F16H 2048/346* (2013.01); *G01B 7/14* (2013.01)

(58) Field of Classification Search
CPC .................... G01D 5/2013; G01B 7/14; G05B 2219/37292; F16H 48/20–2048/346; B60K 2023/046; F16D 27/02–09
See application file for complete search history.

(56) References Cited

U.S. PATENT DOCUMENTS

| | | | | |
|---|---|---|---|---|
| 7,101,254 | B2* | 9/2006 | Swedek | B24B 37/005 |
| | | | | 451/286 |
| 7,384,359 | B2* | 6/2008 | Pinkos | F16H 48/08 |
| | | | | 192/30 W |
| 9,476,460 | B2* | 10/2016 | Seidl | F16D 27/09 |
| 9,916,710 | B2* | 3/2018 | Momose | G07D 5/08 |
| 9,970,525 | B2* | 5/2018 | Zaers | F16H 48/08 |
| 10,036,658 | B2* | 7/2018 | Hernandez-Oliver | |
| | | | | G01D 5/2006 |
| 10,145,908 | B2* | 12/2018 | David | G01R 33/093 |
| 10,184,846 | B2* | 1/2019 | Lu | G01D 3/0365 |
| 10,816,072 | B2* | 10/2020 | Hillman | F16H 48/08 |
| 10,876,826 | B2* | 12/2020 | Ledoux | G01B 7/26 |
| 2004/0138838 | A1* | 7/2004 | Scheiner | G01B 7/105 |
| | | | | 702/64 |

(Continued)

FOREIGN PATENT DOCUMENTS

WO    WO-2016196187 A1 * 12/2016 ............. G01D 5/145

*Primary Examiner* — Ernesto A Suarez
*Assistant Examiner* — James J Taylor, II
(74) *Attorney, Agent, or Firm* — McCoy Russell LLP

(57) ABSTRACT

Methods and systems are provided for a sensor assembly for a differential apparatus. In one example, the sensor assembly includes a microcontroller and an eddy current sensor communicatively coupled to the microcontroller and configured to detect a distance between an axially slidable and an axially stationary component of a differential apparatus.

19 Claims, 13 Drawing Sheets

(56) References Cited

U.S. PATENT DOCUMENTS

| | | | |
|---|---|---|---|
| 2007/0142157 A1* | 6/2007 | Nofzinger | F16H 48/295 |
| | | | 475/231 |
| 2009/0247350 A1* | 10/2009 | Donofrio | F16H 48/08 |
| | | | 475/231 |
| 2012/0276661 A1* | 11/2012 | Iravani | H01L 22/26 |
| | | | 438/10 |
| 2019/0195327 A1 | 6/2019 | Creech et al. | |
| 2019/0270298 A1* | 9/2019 | Davies | B41F 3/58 |
| 2020/0232151 A1* | 7/2020 | Savini | D06F 39/081 |

* cited by examiner

EDDY CURRENT SENSOR ASSEMBLY

CROSS-REFERENCE TO RELATED APPLICATIONS

The present application claims priority to U.S. Provisional Application No. 62/818,522, entitled "Eddy Current Sensor Assembly", and filed on Mar. 14, 2019. The entire contents of the above-listed application are hereby incorporated by reference for all purposes.

TECHNICAL FIELD

The present disclosure relates to an eddy current sensor assembly, and more particularly to an eddy current sensor assembly for an electrical locking differential.

BACKGROUND AND SUMMARY

Electrical control of coupling large rotating mechanical components requires actuators to move the mechanical components over relatively long distances. For example, axle assemblies in vehicle drivetrains may utilize a differential apparatus to transmit torque from a power to vehicle wheels. The differential apparatus may enable an outer drive wheel to rotate at a greater velocity than an inner drive wheel when operating the vehicle through a turn, thereby dividing power between connected vehicle wheels.

During instances when one wheel is unintentionally stationary and all of the power is transferred to the remaining movable wheel, wheel slip may occur and may cause uncontrolled movement of the vehicle. To circumvent this issue, the vehicle may be configured with at least one locking differential. The locking differential may lock axle half shafts together to rotate as a unitary shaft when traction differs between the connected vehicle wheels. Thus, the wheels are forced to rotate at a same speed, providing enhanced traction to the wheels during, for example, fast accelerations or navigation over soft, uneven surfaces.

The locking differential may be locked via a device that engages a locking gear with the differential. The locking gear mitigates independent movement of the axle half shafts. However, the locking gear may not immediately engage with the differential apparatus, leading to uncertainty regarding the locked state of the differential apparatus.

In one example, the status of the locking gear may be monitored by adapting an actuator of the locking differential with a sensor assembly. Engagement and disengagement of the locking gear may be controlled electronically by, for example, a large electromagnetic solenoid. An electrical control strategy may include monitoring a position of the solenoid in order to verify or determine an actual state of locking gear. Thus, a sensor assembly for the solenoid able to provide robust measurement and reporting of the position of mechanical components of the locking differential relative to each other over a relatively long distance, e.g., 1-5 mm, and in the presence of large magnetic fields may be demanded. Furthermore, a lightweight, low cost sensor assembly with high resistance to wear may be desirable.

The issues described above may be at least partially addressed by adapting a differential apparatus with an eddy current sensor. In one example, a sensor assembly includes an eddy current sensor communicatively coupled to a microcontroller and configured to detect a distance between an axially slidable component and an axially stationary component of a differential apparatus.

The sensor assembly of the present disclosure utilizes effects of eddy currents on a high frequency magnetic field. The sensor assembly provides a source of magnetic field. An output of the magnetic field source in the sensor assembly is a function of the eddy currents that are created in a target material. The output of the magnetic field source is measured. The measurement is indicative of a distance to the target. In this way, a non-contact sensor may precisely monitor a status of the differential apparatus without incurring additional cost and complexity.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIGS. 2-7 and 9-7 are shown approximately to scale.

DETAILED DESCRIPTION

Figure 1:
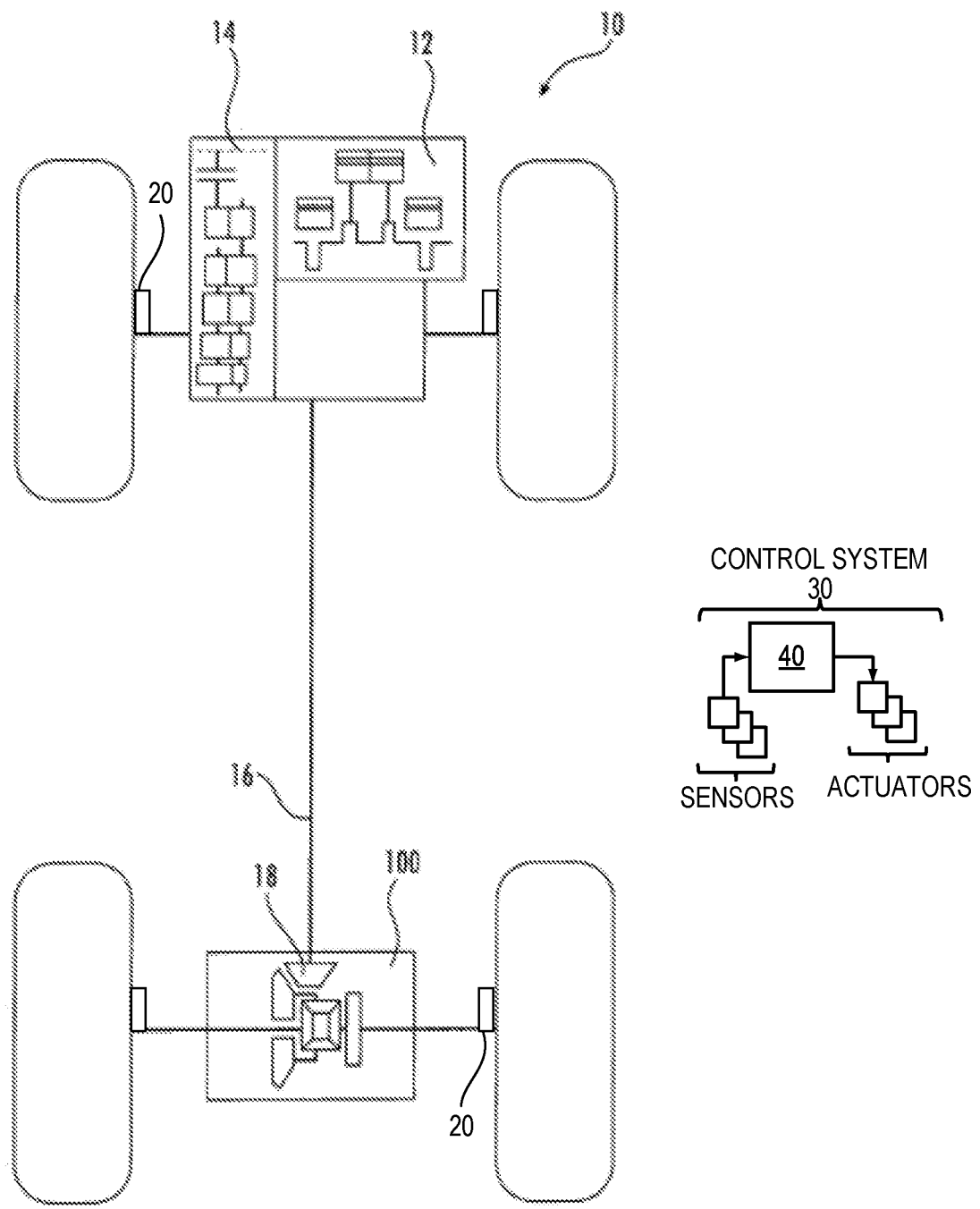
FIG. 1 is a schematic illustration of a vehicle according to embodiments.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 6:
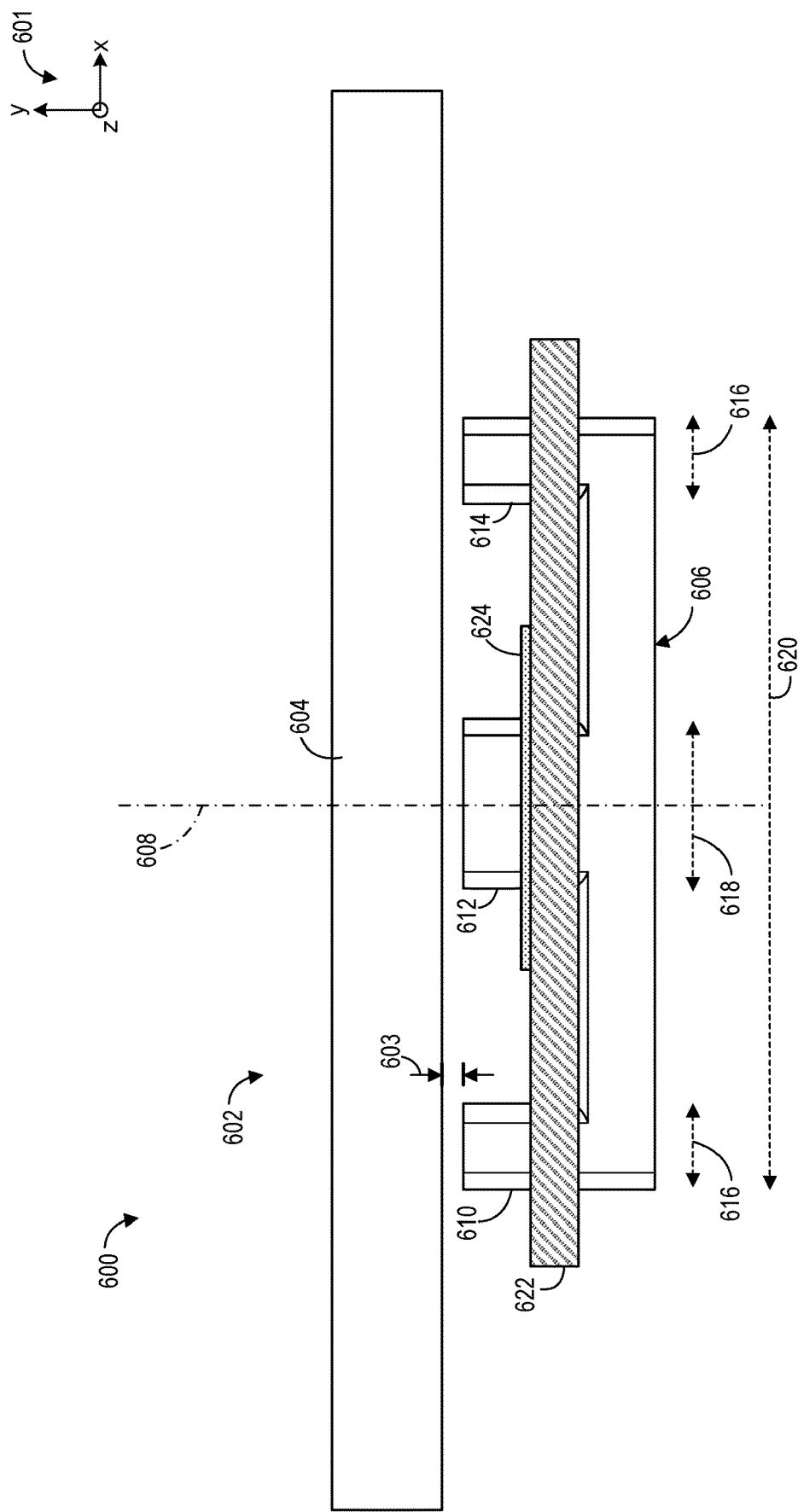
FIG. 6 is an example of an eddy current sensor which may be implemented in the axle assembly of FIGS. 2-5.
Figure 7:
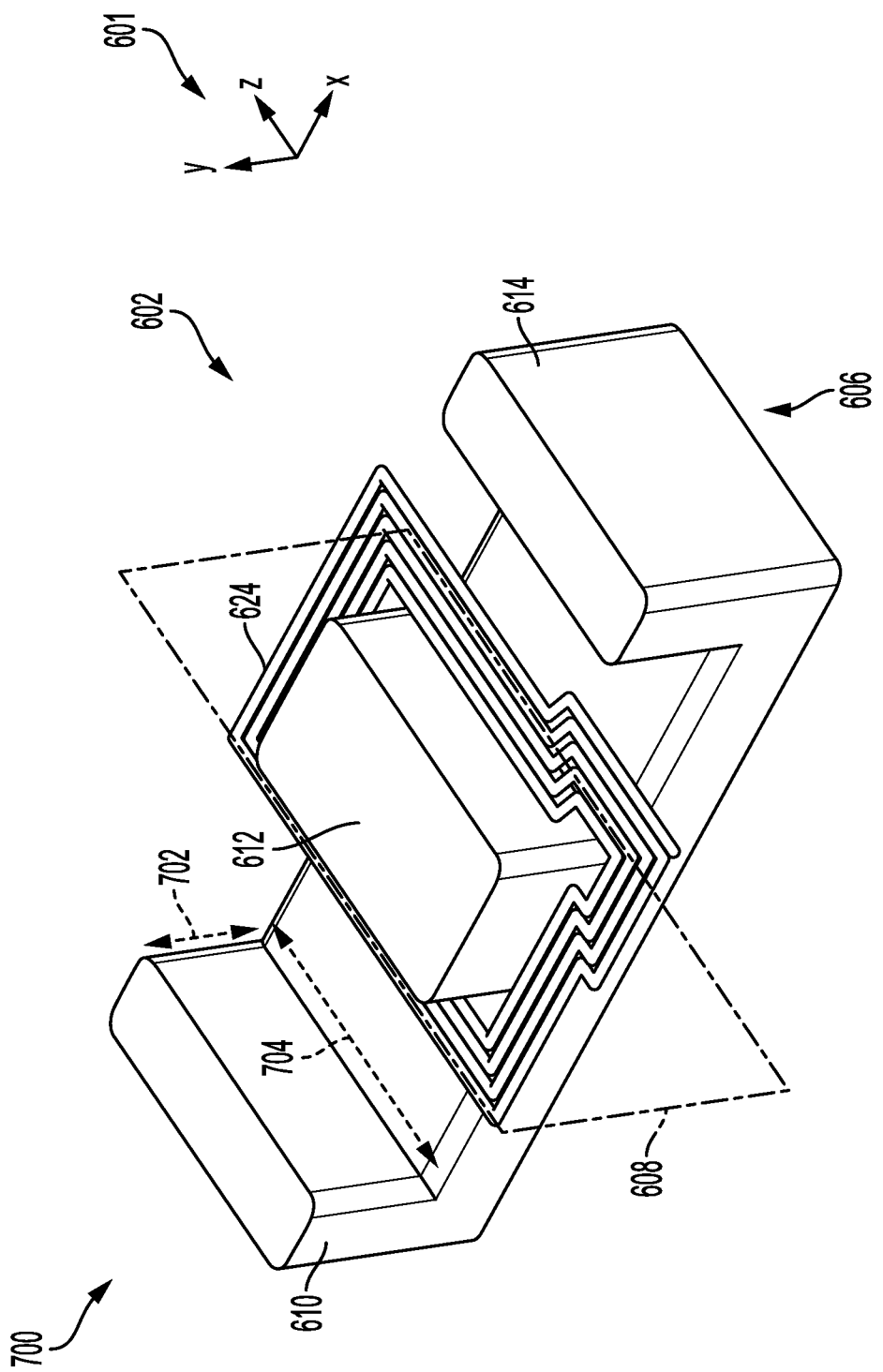
FIG. 7 is a perspective view of an exemplary eddy current sensor.
Figure 8:
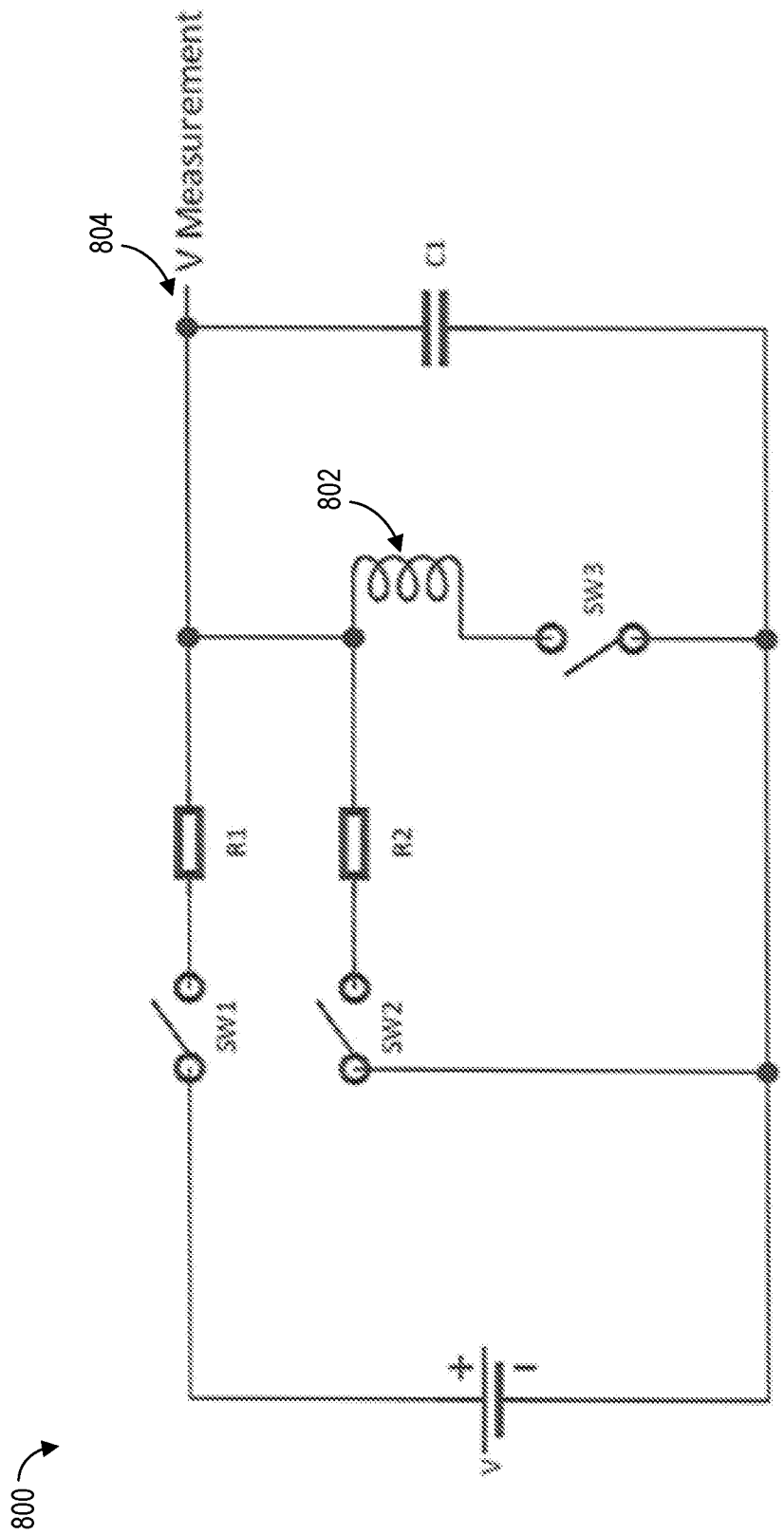
FIG. 8 is a schematic of an electronic circuit of the eddy current sensor.
Figure 10:
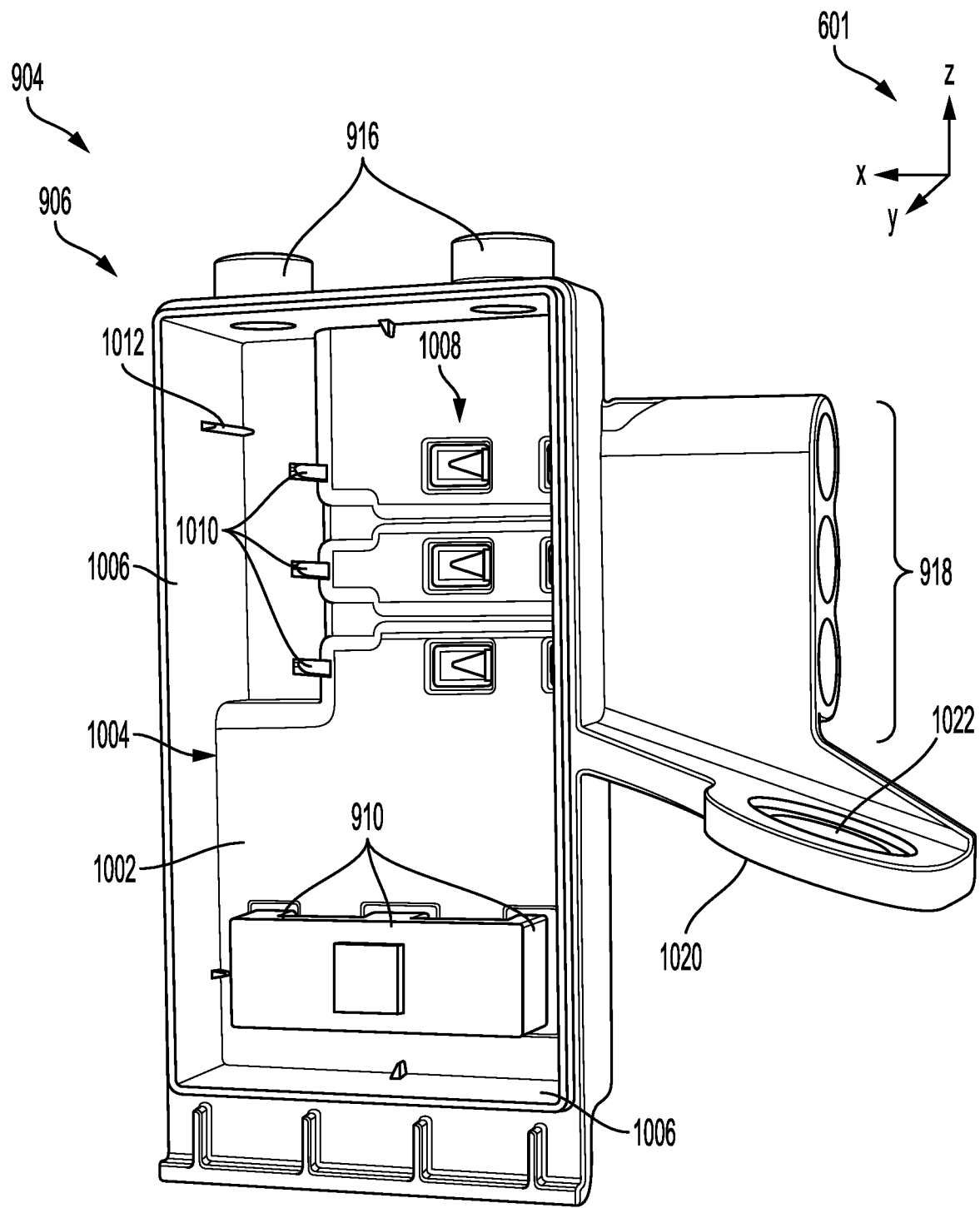
FIG. 10 is a perspective view of a portion of a housing of the sensor assembly of FIG. 9.
Figure 11:
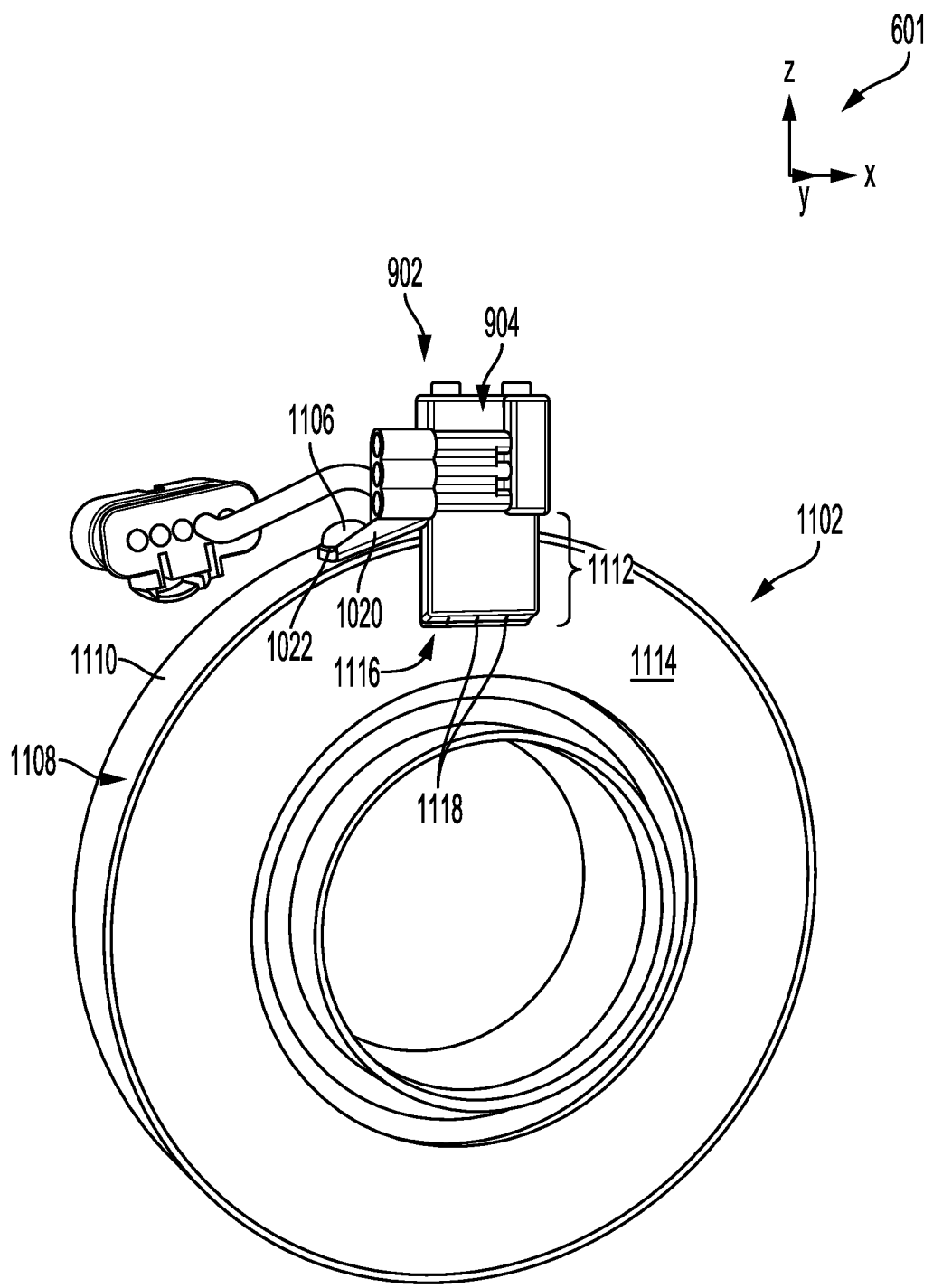
FIG. 11 is a perspective view of the sensor assembly coupled to a solenoid.
Figure 12:
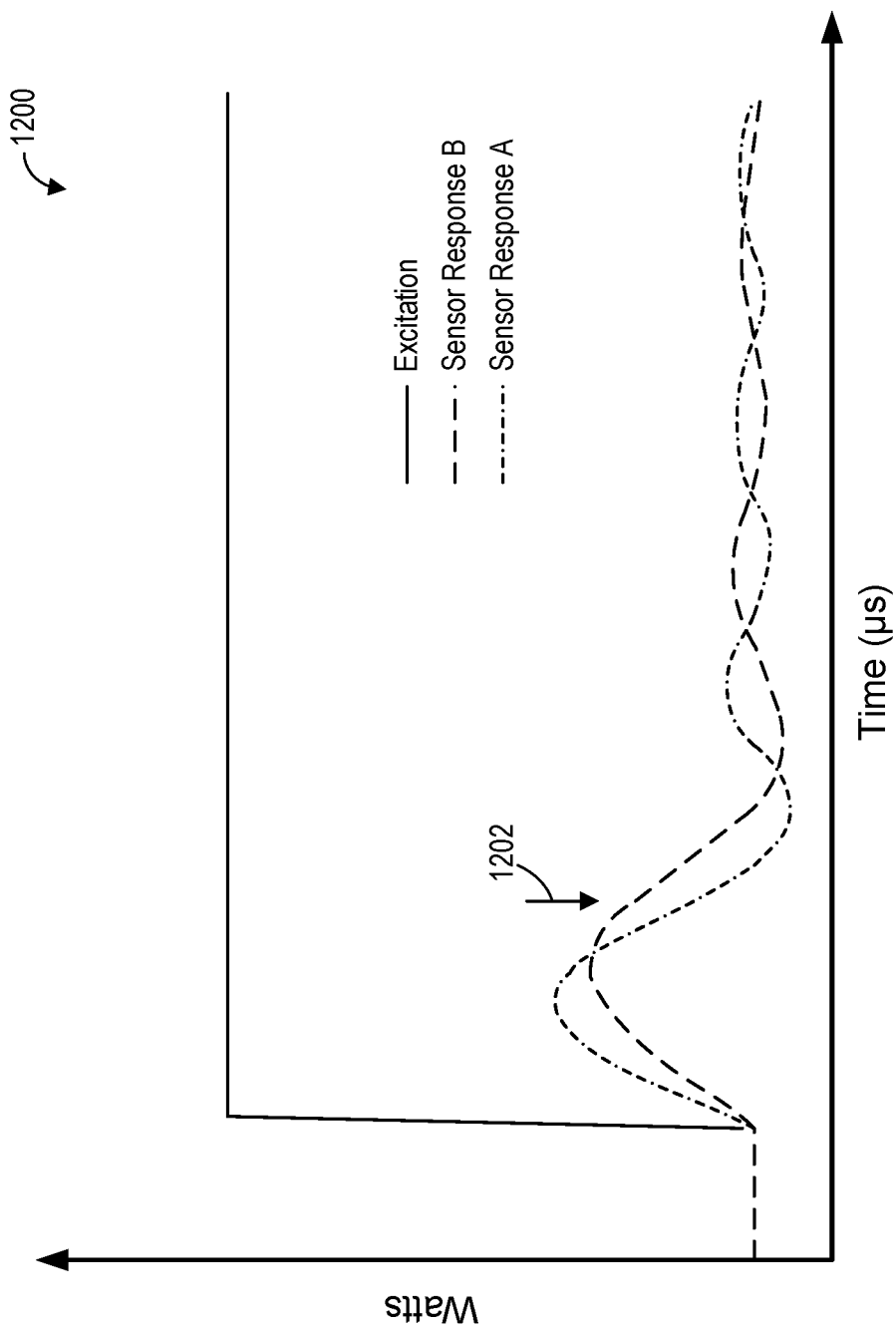
FIG. 12 is a graph plotting signals measured by the sensor assembly with time.
Figure 13:
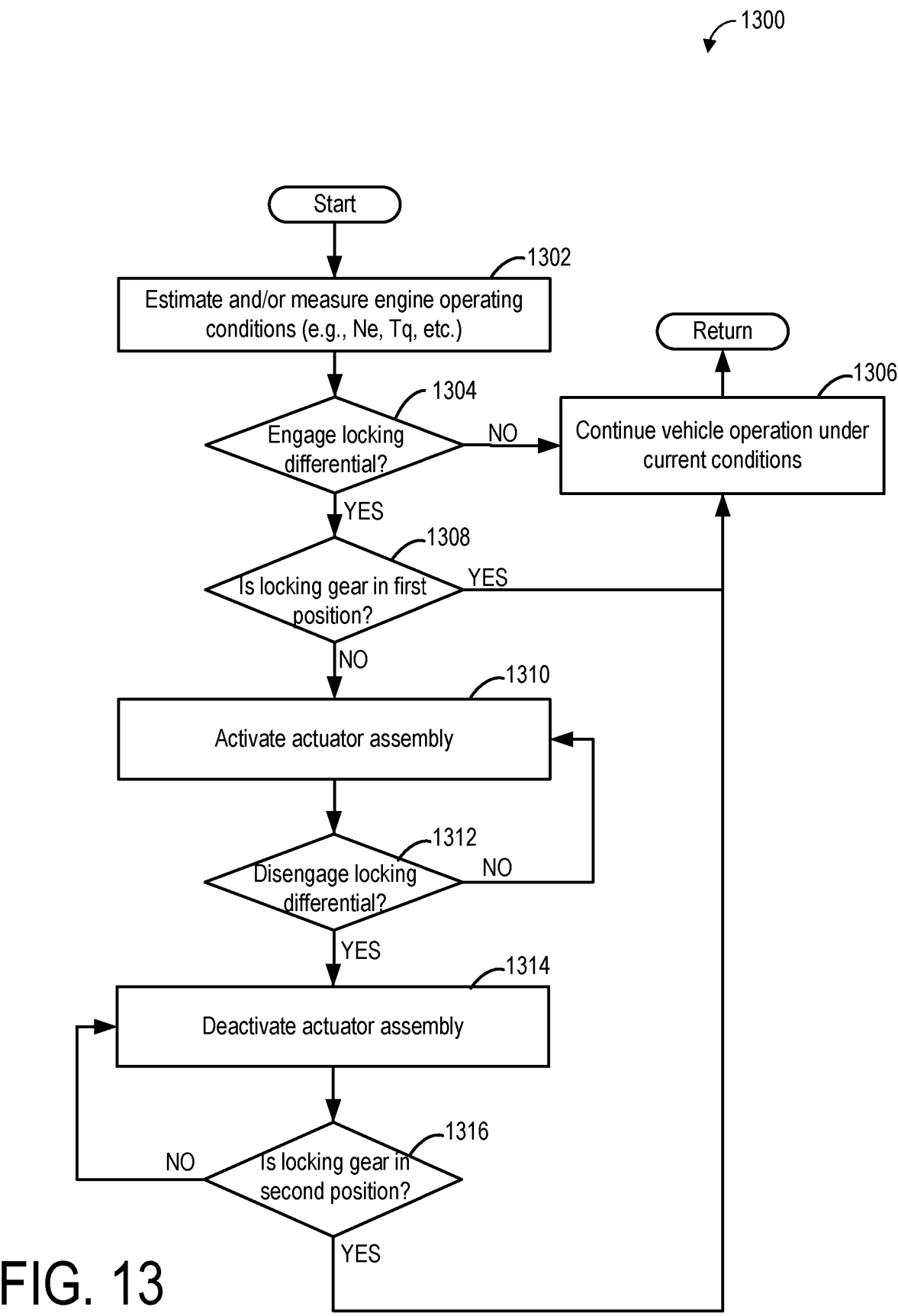
FIG. 13 is an example of a routine for utilizing an eddy current sensor to monitor a position of a differential apparatus.

A differential apparatus may be implemented in an axle assembly of a vehicle to control an amount of torque delivered to wheels of the vehicle. An example of a vehicle is shown in FIG. 1 and an example of an axle assembly which may be coupled to wheel axles of the vehicle is shown in different views in FIGS. 2-5. The axle assembly includes a locking differential adjustable via an actuator assembly. A position of the actuator assembly, and thus a status of the locking differential, e.g., unlocked to allow axle half shafts to operate independently or locked to force the half shafts to rotate as a unit, may be determined by a sensor assembly coupled to the actuator assembly. An example of a sensor of the sensor assembly is illustrated in FIGS. 6-7 and a schematic depicting a circuitry of the sensor is shown in FIG. 8. Signals detected by the sensor and used to determine the status of the locking differential are plotted in a graph showing signal power with time in FIG. 12. The sensor assembly may include a housing enclosing the sensor, as shown in an exploded view of the sensor assembly in FIG. 9. The housing may include at least two portions, one of which is shown in detail in FIG. 10. The sensor assembly may be directly coupled to the actuator assembly, as illustrated in FIG. 11. An example of a routine for determining a position of the locking differential via sensor assembly is shown in FIG. 13.

Turning now to FIG. 1, an example of a vehicle 10 includes a motor 12 (e.g., an internal combustion engine) driveably connected with a transmission 14. An output of the transmission 14 is driveably connected with an axle assembly 100 via a propeller shaft 16. The axle assembly 100 is depicted as a rear axle assembly; however, in other examples, the axle assembly 100 may be located as a front axle, a rear axle, or one of a tandem axle pair without departing from a scope of the present disclosure. Each axle may couple a pair of wheels 5 of the vehicle 10. Each of the wheels 5 may be adapted with a wheel speed sensor 20 to monitor and report a rotational speed of each wheel to a control system 30. For example the wheel speed sensor 20 may be communicatively coupled to a dynamometer communicatively coupled to the control system 30, which estimates torque applied to each wheel based on a speed of a prime mover, e.g., an engine of the vehicle 10, and a speed of the wheel.

Control system 30 may be communicatively coupled to various components of vehicle 10 to carry out the control routines and actions described herein. For example, as shown in FIG. 1, control system 30 may include controller 40. Controller 40 may be a microcomputer, including a microprocessor unit, input/output ports, an electronic storage medium for executable programs and calibration values, random access memory, keep alive memory, and a data bus. As depicted, controller 40 may receive input from a plurality of sensors, which may include user inputs and/or sensors (such as the wheel speed sensor 20, transmission gear position, gas pedal input, brake input, transmission selector position, vehicle speed, engine speed, engine temperature, ambient temperature, intake air temperature, etc.), cooling system sensors (such as coolant temperature, fan speed, passenger compartment temperature, ambient humidity, etc.), and others (such as Hall Effect current sensors from the alternator and battery, a system voltage regulator, etc.). Further, controller 40 may communicate with various actuators, which may include engine actuators (such as fuel injectors, an electronically controlled intake air throttle plate, spark plugs, etc.), cooling system actuators (such as motor actuators, motor circuit relays, etc.), an actuator of the axle assembly 100, and others. As an example, controller 40 may send a signal to the actuator of the axle assembly 100 to engage/disengage a locking differential. In some examples, the storage medium may be programmed with computer readable data representing non-transitory instructions executable by the processor for performing the methods described below as well as other variants that are anticipated but not specifically listed.

Examples of axle assembly 100 are described below. The axle assembly 100 may be utilized with an all-wheel drive vehicle, a pure electric vehicle or a hybrid four-wheel-drive vehicle where the front axle is driven by the motor 12, and the rear axle includes the axle assembly 100. In other examples, the rear axle may be driven by the motor 12 and the front axle may include the axle assembly 100. In still other examples, the axle assembly 100 may be utilized in a hybrid commercial vehicle (not depicted) comprising a tandem axle in which the front tandem axle is driven by an internal combustion engine, and the rear tandem axle includes one of the axle assembly 100 (or vice versa). The axle assembly 100 may have applications in commercial vehicles, both light duty and heavy duty vehicles, and for passenger, off-highway, and sport utility vehicles. Additionally, the axle assembly 100 described herein may be adapted for use in front and/or rear driving axles, and in steerable and non-steerable axles. It will be appreciated that the axle assembly 100 also may have industrial, locomotive, military, agricultural, and aerospace applications.

In some instances, the axle assembly 100 may be used in an integrated drive system. The axle assembly 100 may include an electric motor (not depicted in FIG. 1) (e.g., electromotor) coupled with a power source (not depicted in FIG. 1). The electric motor may be a permanent magnet synchronous machine comprising a stator disposed concentrically about a rotor. The axle assembly 100 may additionally comprise an inverter (not depicted in FIG. 1) for converting direct current to alternating current when the electric motor is utilized to drive the vehicle, and for converting alternating current to direct current when the vehicle decelerates. The electric motor may be referred to herein as a motor-generator. Further, the axle assembly 100 may include cooling fluid (not depicted in FIG. 1) such as, but not limited to, automatic transmission fluid or axle oil integrated with the axle assembly 100 for cooling the electric motor and the inverter. In another example (not depicted in FIG. 1), the cooling fluid for the electric motor and the inverter may not be integrated with the axle oil. The axle assembly 100 may have either a co-axial or off-axis layout where the axle shaft connecting the wheel to the differential does not pass through the center or the motor but rather parallel to the motor axis.

Figure 2:
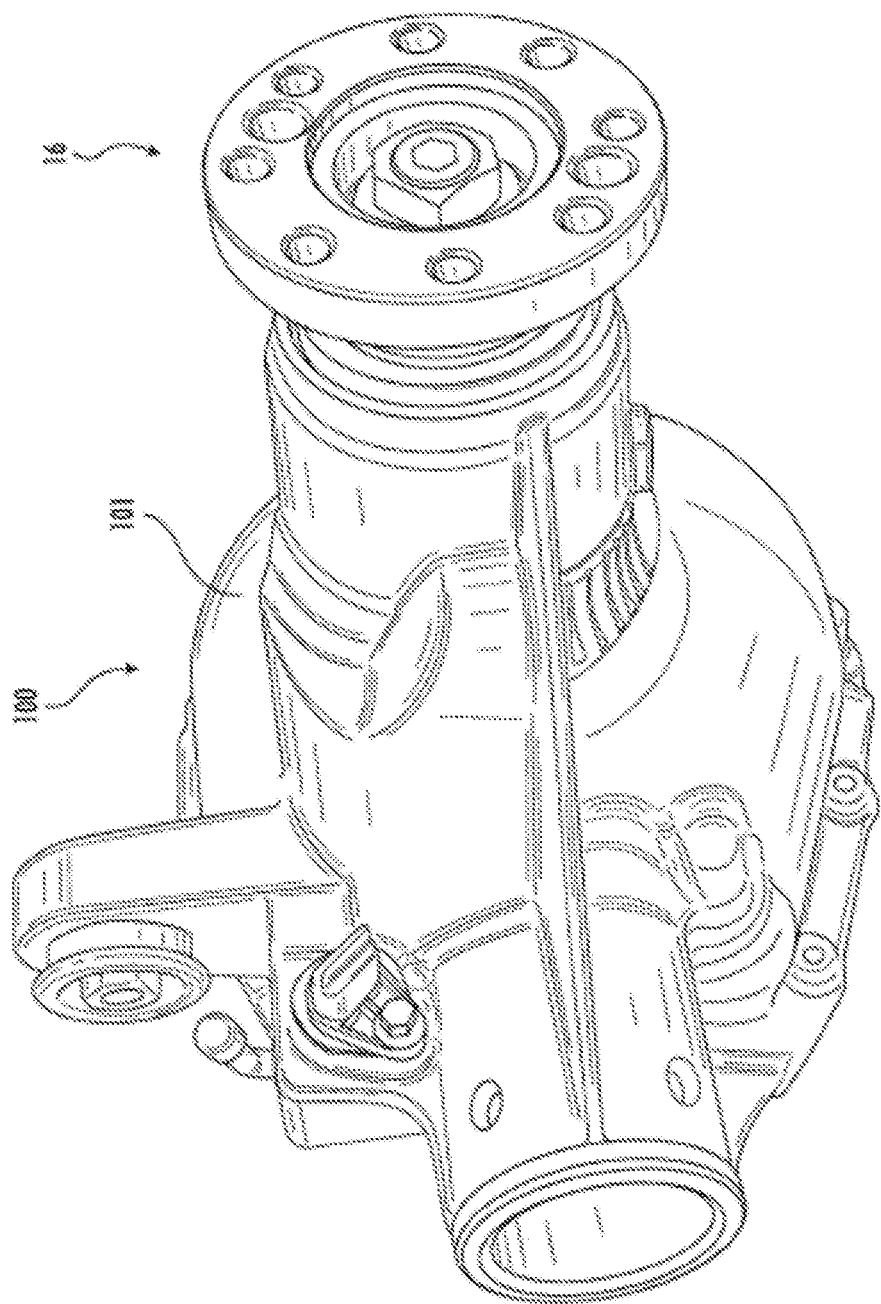
FIG. 2 is a side perspective view of an axle assembly schematically depicted in FIG. 1.

The axle assembly 100 is further depicted in FIG. 2 and includes a carrier housing 101. As shown in more detail in FIG. 4, the pinion gear 18 of FIG. 1, and at least a portion of the propeller shaft 16 are rotatably supported within the carrier housing 101 via one or more bearings 103.

Figure 3:
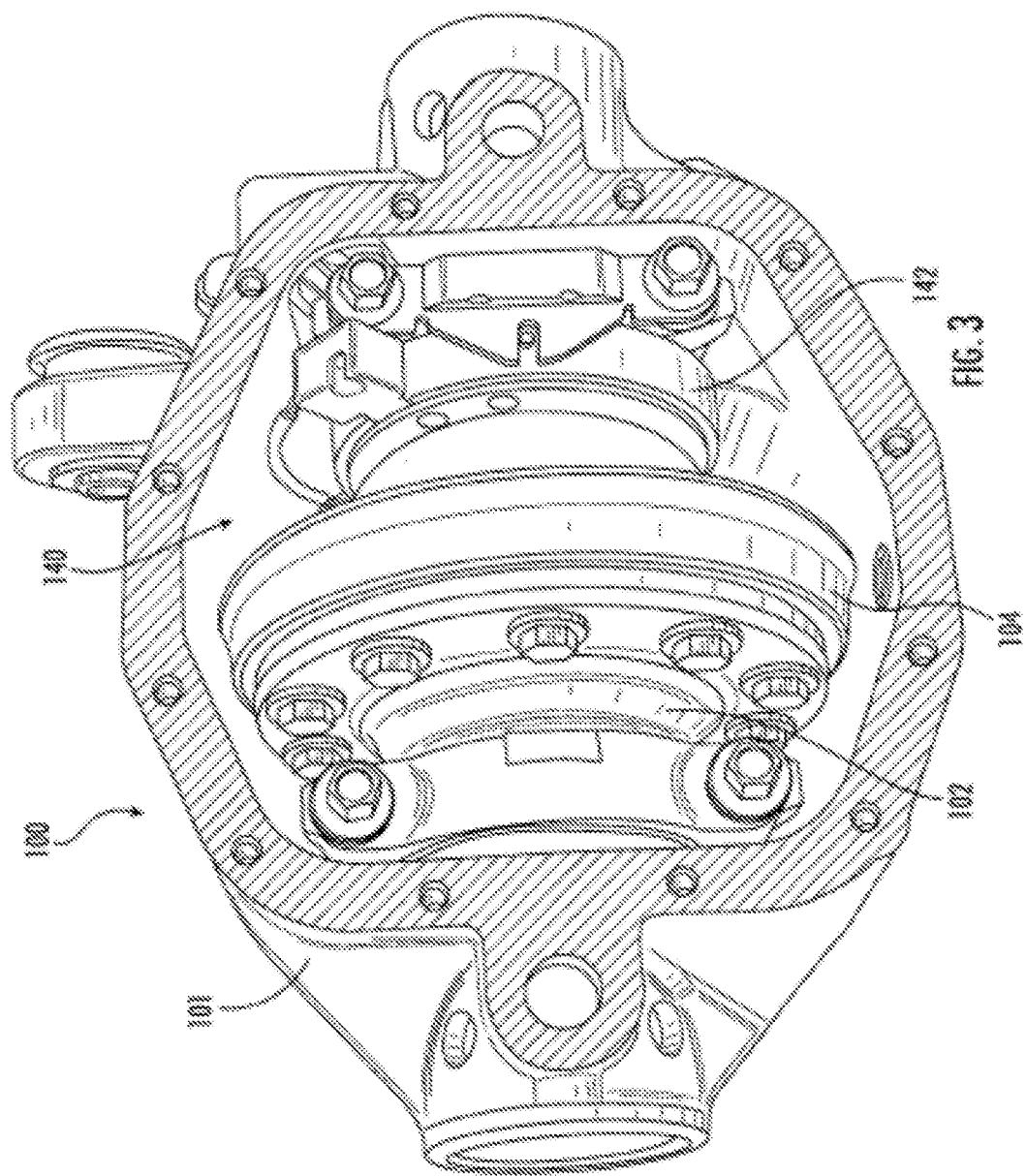
FIG. 3 is a rear perspective view of the axle assembly shown in FIG. 2 with a portion of a carrier housing removed to show a differential apparatus and an actuator assembly coupled thereto.
Figure 4:
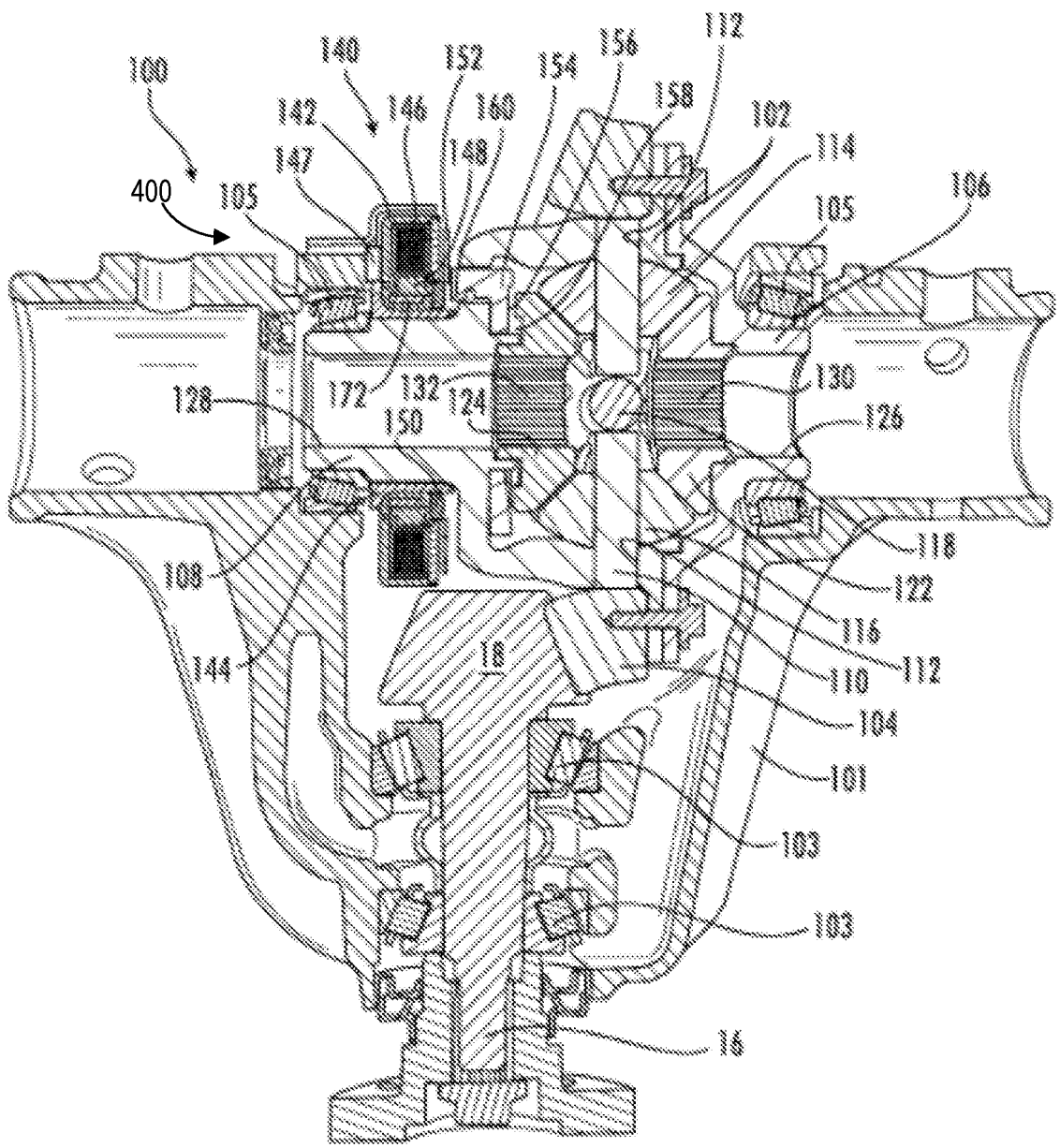
FIG. 4 is first cross-section of the axle assembly shown in FIGS. 2-3.

Turning now to FIGS. 3 and 4, FIG. 3 shows a perspective view of the axle assembly 100 with a portion of the carrier housing 101 removed and FIG. 4 shows a first cross-section of the axle assembly 100. The axle assembly 100 includes a differential mechanism comprising a differential case 102 mounted for rotation within the carrier housing 101. The pinion gear 18 is in meshed engagement with a ring gear 104, and conveys torque to the differential case 102 via the ring gear 104. The ring gear 104 may be integrally formed with the differential case 102, or may be coupled with the differential case 102 via welding or mechanical fasteners. The differential case 102 is mounted for rotation within the carrier housing 101 via a pair of bearings 105. The bearings 105 are disposed about a first and second trunnion 106, 108, respectively, on opposing portions of the differential case 102. In an embodiment, the differential case 102 may be produced via the process of flow forming a metallic material such as, but not limited to, steel, premium carbon steel, aluminum, and aluminum alloys.

Figure 5:
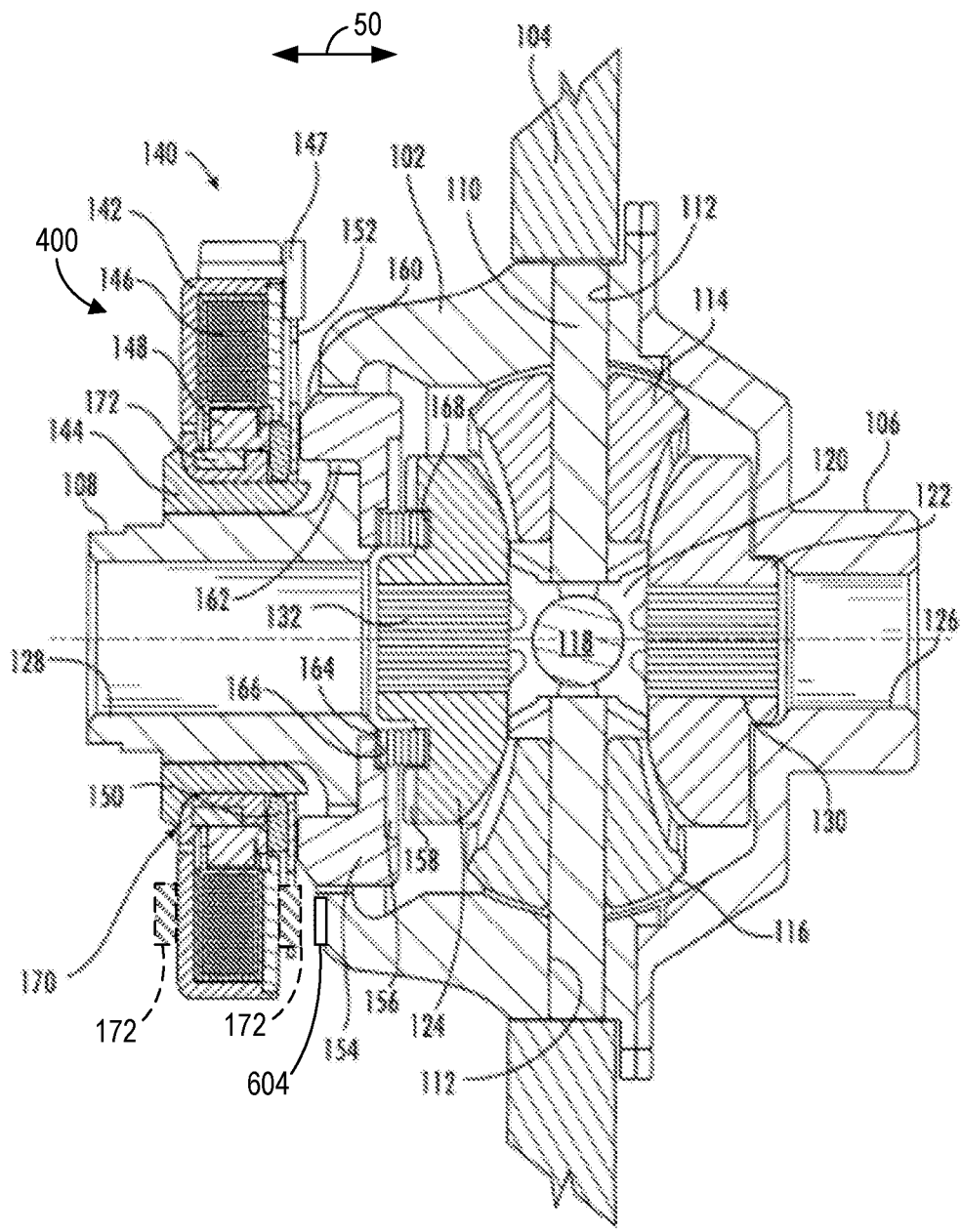
FIG. 5 is a second cross-section showing a detailed view of the differential assembly and the actuator assembly.

With reference to FIGS. 4 and 5, a first pinion shaft 110 is disposed in the differential case 102. The differential case 102 is shown in greater detail in FIG. 5. In one example, the first pinion shaft 110 extends through the differential case 102 and is coupled at its ends in two opposing apertures 112 through the differential case 102. First and second pinion gears 114, 116, are mounted on each end of the first pinion shaft 110, respectively. In some examples, as more clearly illustrated in FIG. 5, a second pinion shaft 118 extends into the differential case 102 transverse the first pinion shaft 110 and is coupled at its ends with the differential case 102. A third pinion gear 120 and a fourth pinion gear (not depicted) are rotatably supported on the ends of the second pinion shaft 118. In other embodiments, however, the pinion gears 120, may be supported by a unitary cross pin.

The pinion gears 114, 116, 120 are meshed with a first side gear 122 and a second side gear 124 within the differential case 102. The side gears 122, 124 comprise radially inward projecting splines 130, 132, respectively, to engage axle half shafts (not depicted) or stub shafts (not depicted). The differential case 102 comprises openings 126, 128 through the differential case trunnions 106, 108 to accommodate the axle half shafts coupled with the side gears 122, 124. The axle half shafts are inserted into the openings 126, 128 and into the side gears 122, 124 where they engage the internal splines 130, 132 of the side gears 122, 124, respectively. In one example, the axle half shafts may be secured in their position in the axle assembly 100 by c-clips (not depicted) inserted into grooves in the axle half shafts.

The axle assembly 100 includes a locking assembly 400, as shown in FIGS. 4 and 5. The locking assembly 400 includes components such as an actuator assembly 140, a substantially cylindrical armature 148, and a locking gear 154, amongst other components. The components may be coupled to one another so that the components do not rotate relative to the differential case 102. However, the components may be configured to slide axially as a unit, as described further below.

As illustrated in FIGS. 3-5, the actuator assembly 140 is mounted on the differential case trunnion 108. The actuator assembly 140 is coupled with the differential case 102 such that the actuator assembly 140 is fixed against rotation relative to the differential case 102. Referring now to FIG. 5, the actuator assembly 140 comprises a housing 142. In an embodiment, the housing 142 may have an annular geometry such that an inner portion of the housing 142 is coupled with a sleeve 144. The sleeve 144 is coupled with the differential case trunnion 108. An actuator component 146 such as an electromagnetic coil and/or, as shown in FIG. 11, a solenoid, for example, is disposed within the housing 142. The actuator assembly 140 may further include the armature 148, which may be a piston or plunger in some examples, and a top plate. In other examples, the actuator assembly 140 may be defined by a solenoid, a sensor, and any attachment mechanism or devices. The actuator component 146 is in electrical communication with a power source (not depicted), such as, but not limited to, a battery. The actuator component 146 may also be in communication with a controller 147. In the example shown in FIG. 5, the controller 147 may be mounted to an inboard portion of the housing 142. In other examples, the controller 147 may be mounted to an outboard surface of the housing 142 or to a radial outer surface of the housing 142.

The armature 148 is disposed in the housing 142, radially between the actuator component 146 and the inner portion of the housing 142. In one example, the armature 148 does not rotate relative to the housing 142. The armature 148 may include a ferromagnetic material. Disposed axially adjacent to the armature 148, on an inboard side thereof, is an annular spacer 150. The annular spacer 150 may be formed of a polymeric material. As an example, as illustrated in FIG. 5, a pressure plate 152 may be positioned axially adjacent to an inboard side of the spacer 150. However, other examples may include the actuator assembly 140 without the pressure plate 152. Further, the locking gear 154 is disposed axially between the spacer 150 and the side gear 124. The locking gear 154 defines a plurality of teeth 156 located on an axially inboard surface thereof. The locking gear teeth 156 may selectively engage complimentary teeth 158 defined by an axially outboard surface of the side gear 124.

The locking gear 154 is axially slideable between a first position, illustrated in FIG. 5, where the locking gear 154 is disengaged from the side gear 124, and a second position (not depicted) where the locking gear 154 is engaged with the side gear 124. The axial sliding of the locking gear 154 is indicated by arrow 50 in FIG. 5. The locking gear 154 rotates with the differential case 102. For example, the locking gear 154 may include generally axial protrusions 160 disposed through openings 162 in the differential case 102. A mechanical interaction between the locking gear protrusions 160 and the differential case openings 162 causes the locking gear 154 to rotate with the differential case 102.

In one example, the armature 148 is coupled with the locking gear 154. In another example, the armature 148 and the locking gear 154 may be coupled with the spacer 150, such that they move axially as a single unit. The armature 148 and the locking gear 154 may be coupled with the spacer 150 via a snap-fit connection, for example. Coupling the armature 148 and the locking gear 154 prevents the armature 148 from being vibrated into a disengaged position while the locking gear 154 remains in an engaged position. In yet another example, the locking gear 154 may remain temporarily engaged even when the armature 148 is in a disengaged position, due to the key-stone shape of the differential case openings 162 creating an axial force on the locking gear 154 during torque transmission.

A biasing member 164 is disposed axially between the locking gear 154 and the side gear 124. For example, the locking gear 154 may define a groove 166 located in an inboard surface thereof. The locking gear groove 166 is aligned with a groove 168 defined in an outboard surface of the side gear 124. The biasing member 164 may be at least partially located within the grooves 166, 168. The biasing member 164 may be, but is not limited to, one or more springs, one or more wave springs, or one or more Bellville-type washers. In one example, the locking gear groove 166 and the side gear groove 168 may be annular in geometry.

To lock the differential mechanism of the axle assembly 100, in the second position of the locking gear 154, a signal from the controller 147 causes electricity, which may also be referred to herein as an excitation voltage, to be supplied to the actuator component 146. The energized actuator component 146 generates a magnetic flux. The magnetic flux of the actuator component 146 causes the armature 148 to move in an axial direction and drive the locking gear 154 into engagement with the side gear 124, thereby compressing the biasing member 164. To return the locking gear 154 to the first position, and unlock the differential mechanism, the controller 147 causes the supply of electricity to the actuator component 146 to be interrupted or reduced. The termination or reduction in the energization of the actuator component 146 enables the biasing member 164 to urge the locking gear 154 in an axial outboard direction and disengage the side gear 124. When the actuator component 146 is energized, the locking gear 154 may not immediately engage the side gear 124. This time delay may lead to an uncertainty regarding the locked/unlocked state of the differential mechanism. To determine the axial position of the locking gear 154, and therefore the locked/un-locked state of the differential mechanism, a sensor 170 may be utilized. Various types of sensors may be utilized for the sensor 170 such as an eddy current sensor, as described further below with reference to FIGS. 6-13.

In some examples, the sensor 170 may comprise a sensing element 172 having certain physical properties (e.g. an inductance) disposed concentrically about a portion of the actuator assembly 140. The sensing element 172 shown may have a generally disc shape. It is understood, however, that the sensing element 172 may have any shape and size as desired. In one example, the sensing element 172 may be a magnetic core coupled to a printed circuit board as shown in FIG. 6 and described further below. As illustrated in FIG. 5, the sensor 170 includes the sensing element 172 disposed in an annular recess defined by in the inner portion of the housing 142 radially between the inner portion of the housing 142 and the armature 148.

In other examples, the sensing element 172 may be located in different positions relative to moving and stationary components of the axle assembly 100. As shown in FIG. 5, the sensing element 172 may alternatively be located along the inboard or outboard side of the housing 142, e.g., sides of the housing 142 parallel with the first pinion shaft 110. Regardless of orientation within the actuator assembly 140, the actuator assembly, including the sensing element 172, the armature 148, the locking gear 154 and the spacer 150 may move as in unison as a unit when the actuator component 146 is activated/deactivated to facilitate engage/disengagement of the locking gear 154 with the second side gear 124.

As described above, an actuator assembly of an axle assembly, such as a locking differential, may rely on electrical control achieved by use of a large electromagnetic solenoid. The solenoid may enable rotational movement of mechanical components of the axle assembly over distances between 1-5 mm, for example. An electrical control strategy may be implemented to monitor a position of the actuator assembly to determine a coupling status of the rotating components in real-time. Thus a robust and accurate actuator sensor for the actuator assembly that performs efficiently over a relatively large distance in the presence of large magnetic fields is demanded.

Real-time monitoring of the coupling status of the rotating components may be provided by configuring the actuator assembly with an eddy current sensor. A magnetic field source of the eddy current sensor generates a magnetic field that creates eddy currents in an electrically conductive target, the electrically conductive target separated from the magnetic field source by a distance. The eddy currents form an opposing magnetic field, e.g., an inductance, which interacts with the source magnetic field and the interaction may vary based on a distance of the electrically conductive target from the magnetic field source of the sensor. Thus a positioning of the electrically conductive target, which may be directly coupled to the actuating electromagnetic solenoid, may infer the coupling status of the locking differential.

The eddy current sensor may be less costly, more tolerant to exposure to environmental conditions (e.g., temperature, presence of debris, dirt, moisture, lubricants, etc.), and insensitive to presence of materials positioned between the magnetic field source and target in comparison to conventional sensors, such as capacitive sensors. The eddy current sensor may include a microcontroller, such as an 8-bit microcontroller, to control sensor switches, to capture and convert voltage measurements to a pulse width modulated output with a duty cycle proportional to the measured voltage, and to relay voltage sampling and conversion to a controlling processor, e.g., a main controller of a vehicle. The microcontroller may further provide internal circuit diagnostics and fault detection and allow the eddy current sensor to be continually updated and corrected, e.g., corrected for temperature fluctuations, as well as calibrated without disassembling the eddy current sensor.

In one example, the microcontroller may be included in a microcontroller unit (MCU) directly coupled to a printed circuit board (PCB) of the eddy current sensor. In other examples, however, the MCU may be located external to the eddy current sensor and electronically coupled to the eddy current sensor via, for example, cables or wires. As such, it will be appreciated that the MCU be located in a variety of locations relative to the eddy current sensor without departing from a scope of the present disclosure.

In addition, the eddy current sensor may be a low power consuming device. The sensor may perform a single measurement of a signal and update the signal upon each pulse width modulation (PWM) output pulse. The PWM frequency may be 120 Hz (8.3 ms), for example, and at all other times, the microcontroller and supporting circuitry of the sensor may be at a lower power state. As signal measurement may be approximately 20 μs, as an example, the sensor root mean square (RMS) power consumption may be measured in the μA range.

An example of an eddy current sensor 602 is shown in FIGS. 6-7, from an end view 600 in FIG. 6 and a perspective view 700 in FIG. 7. The eddy current sensor 602 is depicted in FIG. 7 without a target plate 604 for brevity. A set of reference axes 601 is provided for comparison between views shown, indicating a y-axis, an x-axis, and a z-axis. The target plate 604 may be planar, e.g., aligned with the z-x plane, and formed of an electrically conductive material, such as a metal. The target plate 604 may have a variety of geometries, e.g., when viewed along the y-axis, such as circular, rectangular, square, elliptical, etc.

In one example, the target plate 604 may be embedded in a stationary component of the axle assembly, e.g., stationary relative to an axially sliding portion of the axle assembly, such as the actuator assembly 140 of FIG. 1. The target plate may be located in a region where movement of the target plate 604 away from a magnetic core 606 of the eddy current sensor 602 does not exceed a distance of 4 mm. For example, as shown in FIG. 5, the target plate 604 may be located in a surface of the differential case 102 proximate to the actuator assembly 140 and axially aligned with the sensing element 172. In other examples, the target plate 604 may be omitted. Instead, the differential case 102 may be formed of a material able to generate an inductance and a proximity of the sensing element 172 to a surface of the differential case 102 may be used to monitor a status of an actuator of the axle assembly.

The eddy current sensor 602 may include a magnetic core 606 which may, in one example, be a ferrite core 606. However, in other examples, the magnetic core 606 may be formed of any material able to generate a magnetic field. As described above, the ferrite core may, in one example, be the sensing element 172 of FIGS. 4 and 5. The ferrite core 606 may generate a magnetic field that is focused within a relatively small area of the target plate 604. Eddy currents formed at the target plate 604 produce an eddy current signal which may vary based on a distance 603 of the target plate 604 from the ferrite core 606.

The ferrite core 606 may be symmetric about a plane 608 and may include a first protruberance 610, a second protruberance 612, and a third protruberance 614 extending upwards, with respect to the y-axis towards the target plate 604. The second protruberance 612 is positioned between the first protruberance 610 and the third protruberance 614 and is centered about a mid-point of a width 620 of the magnetic core 606. The protruberances do not contact the target plate 604. As shown in FIG. 7, the protruberances may each have a similar depth 702 and height 704 but, as shown in FIG. 6, may have different widths. For example, the first protruberance 610 and third protruberance 612 may each have a first width 616 that is less than a second width 618 of the second protruberance 614.

Figure 9:
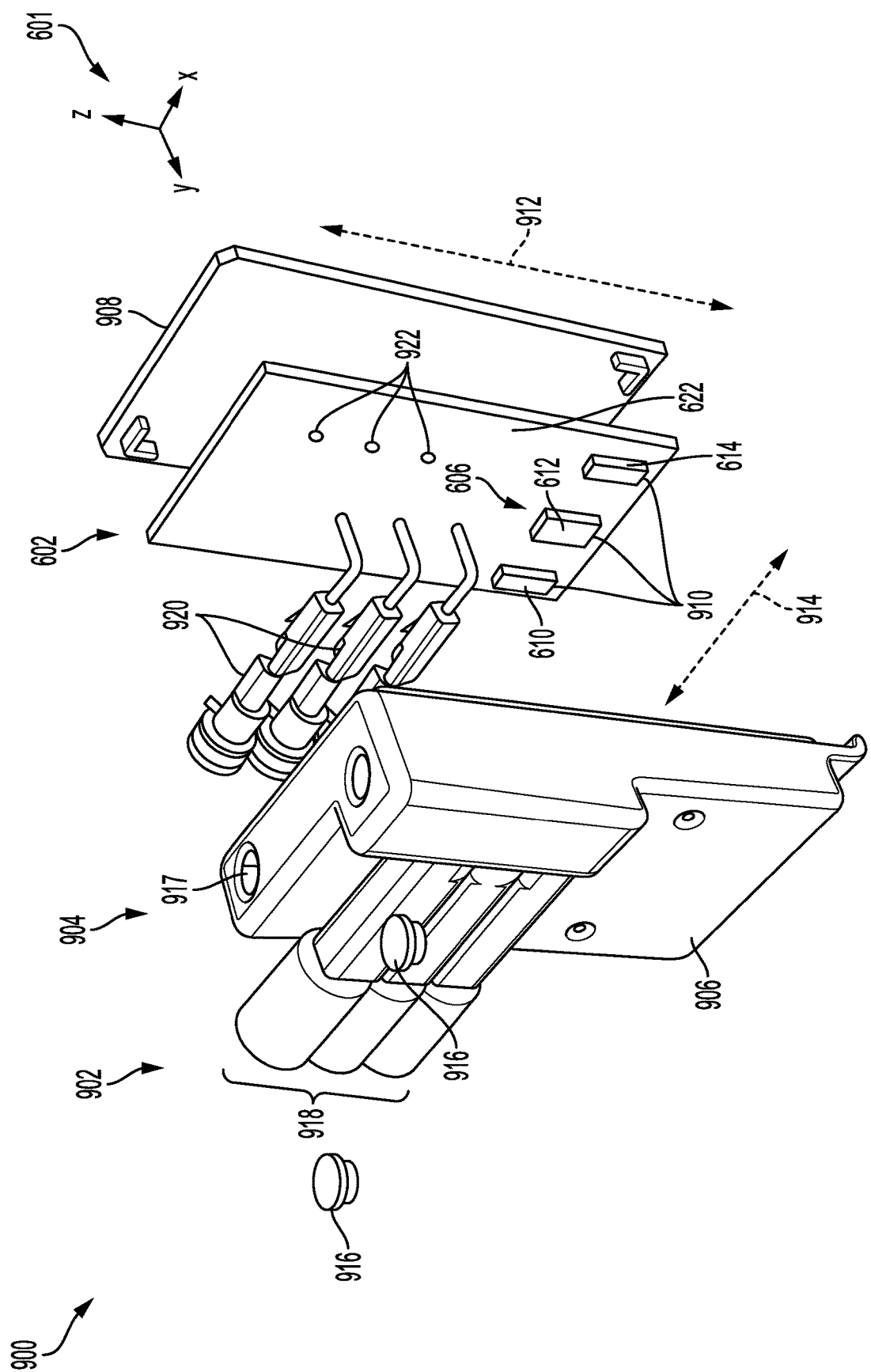
FIG. 9 is an exploded perspective view of a sensor assembly which includes the eddy current sensor of FIGS. 6-8.

A PCB 622, as shown in FIG. 6, may be coupled to the ferrite core 606. For example, the PCB 622 may have apertures with similar dimensions to the first, second and third protruberances 610, 612, 614 (as shown in FIG. 9 and described further below) to allow the protruberances to protrude through the PCB 622, as illustrated in FIG. 6. The PCB may be greater in width, e.g., along the x-axis, and greater in height, e.g., along the z-axis, than the ferrite core 606 but have a smaller depth, e.g., along the y-axis. In one example, as shown in FIG. 9, the PCB 622 may have a rectangular, planar geometry but may have a non-rectangular geometry in other examples.

The PCB 622 may include various electronic components for processing and signal control. The PCB 622 may further include coil windings 624 which may be formed of an electrically conductive material, such as copper. The coil windings 624 are shown in greater detail and without the PCB 622 in FIG. 7 for brevity. The coil windings 624 may have linear sections intersecting at angled regions and may have an overall shape that conforms to a shape of the PCB 622. Thus, the coil windings 624 may have a different geometry than shown in FIG. 7, depending on the geometry of the PCB 622. The coil windings 624 may be a continuous trace winding around the second protruberance 612 of the ferrite core 606 and may be etched, for example, into a surface of the PCB 622. A magnetic field may be generated by the coil windings 624 which may be a sensor coil of the eddy current sensor 602.

Implementation of the eddy current sensor 602 shown in FIGS. 6 and 7 may include configuring a circuitry of the sensor with an electronically controlled semiconductor switching device and a microcontroller, as described above, to provide switch control and digitization of voltage measurements. A simplified circuit schematic of the eddy current sensor is shown in FIG. 8, depicting an electrical circuit 800 which may include the semiconductor switching device. Portions of the circuit 800 may be directly incorporated into the eddy current sensor.

The semiconductor switching device of the circuit 800 may include a first switch SW1, a second switch SW2, and a third switch SW3. The circuit 800 further includes a voltage source V, a first resistor R1, a second resistor R2, a capacitor C1, and a sensor coil 802 of an eddy current sensor, e.g., the coil windings 624 of the eddy current sensor 602 of FIGS. 6 and 7. The voltage source V may be an electrical storage device, such as a battery, for example. Generation of a voltage measurement which may be converted by a microcontroller into a signal (Vmeasurement) is indicated at 804 in a branch of the circuit 800 parallel with the sensor coil 802.

In one example, the third switch SW3 may control a path of current flow through the sensor coil 802 to a return side of the voltage source V. The first switch SW1 may control a path of current flow from a source side of the voltage source V through the resistor R1 through the sensor coil 802 and the capacitor C1. The second switch SW2 may control a path of current flow from the sensor coil 802 and the capacitor C1. The resistors R1 and R2 may regulate the current flow that is sourced and returned, respectively, to the voltage source V.

When the second switch SW2 is open and the third switch SW3 is closed, a transition of the first switch SW1 from open to closed may cause a current transient in the sensor coil 802 and parallel capacitor C1. As more clearly shown in graph 1200 in FIG. 12, the transition (Excitation) and the Vmeasurement signal as a function of time are depicted. The V measurement signal includes a pair of signals (Sensor Response A and Sensor Response B), one for each of two different magnetic fields caused by eddy current variations. The eddy current variation may be a function of a target distance, e.g., the distance 603 between the protruberances of the ferrite core 606 and the target plate 604 as shown in FIG. 6. A sampling of the voltage may be timed to occur at a point in a damped transient signal that provides accurate measurement resolution, e.g., as indicated by arrow 1202. The voltage sampling and conversion is performed by a controlling processor, e.g., a main controller of a vehicle.

Returning to FIG. 8, the first, second, and third switches SW1, SW2, SW3 may be controlled by a microcontroller (e.g., an 8-bit microcontroller), as described above. The microcontroller may measure and convert a sensor signal, e.g., the Vmeasurement signal, which may be translated into a PWM output signal with a duty cycle proportional to the Vmeasurement signal. Translation of the Vmeasurement signal to the PWM output signal may be determined by software implemented in the microcontroller. For example, the microcontroller may be configured with executable instructions to measure and convert the Vmeasurement signal when commanded by the vehicle control unit.

In one example, when the third switch SW3 is open and the first switch SW1 is closed, C1 charges without being subject to the effects of the sensor coil 802. As such, Vmeasurement may capture a performance of all the components of the circuit 800 except for the sensor coil 802. The measurement may be used to subtract out a variation in circuit component due to changes in temperature. Over a predetermined interval, the third switch SW3 may be opened and the measurement conducted to constantly correct the sensor coil measurement.

The eddy current sensor 602 may be enclosed within an outer housing and together, the sensor and outer housing may form a sensor assembly which may, in one example, be the sensor 170 of FIG. 1. An example of a sensor assembly 902 is shown in FIG. 9 in an exploded view 900. The sensor assembly 902 includes the eddy current sensor 602 with most of the ferrite core 606 obscured from view due to its positioning behind the PCB 622.

A housing 904 of the sensor assembly 902 may have a first portion 906 and a second portion 908. The first portion 906 may couple with the second portion 908 to form a cavity therein. The portions may be joined by a variety of methods such as mechanical and liquid fasteners, interference or snap fit, amongst others. The eddy current sensor 602 may be disposed within the cavity of the housing 904.

The PCB 622 includes apertures 910 corresponding to the first, second, and third protruberances 610, 612, 614 of the eddy current sensor 602. As illustrated in FIG. 9, the protruberances may be inserted through the apertures 910 and extend away from the PCB 622, along the y-axis, protruding from a surface of the PCB 622. The ferrite core 606 may be positioned between the PCB 622 and the second portion 908 of the housing 904 and may extend along a portion of a height 912 and a width 914 of the PCB 622 as defined by the apertures 910. The PCB 622 may include the coil windings 624 shown in FIGS. 6 and 7 (omitted in FIG. 9 for brevity) on a surface of the PCB 622 facing the first portion 906 of the housing 904.

When the first and second portions 906, 908 of the housing 904 are coupled to one another, the PCB 622 and the ferrite core 606 may be entirely enclosed within the housing 904. In some examples, the coupling of the first and second portions 906, 908 may form a sealed joint which blocks fluids, including gases and liquids, external to the housing 904 from penetrating through the housing 904 and contacting the eddy current sensor 602. The housing 904 may further include plugs 916, for example, to seal any openings 917 in the housing 904. As such, air inside the housing 904 may not be fluidically coupled to air outside the housing 904 when the sensor assembly 902 is fully assembled.

The sensor assembly 902 may further include connectors 920, e.g., electrical terminals. In some examples, as shown in FIG. 9, the connectors 920 may be at least partially enclosed within the housing 904. The connectors 920 may be configured to electrically connect the sensor assembly 902 to a main controller (e.g., a vehicle Controller Area Network). For example, the connectors 920 may form a wired connection between the PCB 622 and the main controller. The PCB 622 may include holes 922 corresponding to ends of the connectors 920 to enable contact between the connectors 920 and electrical components of the PCB 622. The holes 922 may be through-holes, extending entirely through a thickness of the PCB 622, allowing the connectors 920 to be inserted therethrough and secured in place by, for example, soldering.

The first portion 906 of the housing 904 may include sleeves 918 configured to enclose each of the connectors 920. The sleeves 918 may have inner passages, through which the connectors 920 may be inserted and extend therethrough, and include sealing surfaces within the inner passages to sealingly engage the connectors 920. For example, the sleeves 918 may be equipped with gaskets or o-rings to seal a space between the connectors 920 and an inner surface of each of the sleeves 918. As such, ingress of fluids, such as oil, into the sensor assembly 902 is inhibited.

The housing 904 may be formed of a rigid durable material, such as a polyamide 66 with a 35% glass filled matrix. In other examples, the housing may be formed some other type of material that provides structural integrity to the housing without exhibiting magnetic behavior. In particular, the second portion 908 of the housing 904 may be positioned between the PCB 622 and a target, e.g., the target plate 604 of FIG. 6. As the eddy current sensor is dependent on interaction of magnetic fields between the PCB 622 and the target, precise determination of a distance between the ferrite core 606 and the target may be adversely affected if the material of the second portion 908 of the housing 904 interferes with the magnetic fields.

An inner surface of the first portion 906 of the housing 904, e.g., a surface facing the second portion 908 of the housing 904, may be further adapted with structures to maintain a position of the PCB within the housing 904. For example, as shown in FIG. 10, an inner surface 1002 of the first portion 906 of the housing 904 may include various recesses and grooves. The ferrite core 606 is depicted with the protruberances of the ferrite core 606 inserted through the apertures 910 of the first portion 906 of the housing 904.

The PCB (not shown in FIG. 10) may be positioned between the ferrite core 606 and the inner surface 1002 of the first portion 906 of the housing 904 with at least one of the protruberances of the ferrite core 606 inserted through the PCB, as shown in FIG. 7. The PCB may have dimensions and a geometry similar to an inner cavity 1004 of the first portion 906 of the housing 904, e.g., a space surrounded by the inner surface 1002 and side walls 1006 of the first portion 906.

The inner surface 1002 of the first portion 906 of the housing 904 may have a locking mechanism 1008 coupled to a terminal 1010 (e.g., electrical terminal). The terminal 1010 may be coupled to a corresponding electrical terminal on the PCB to provide electrical continuity and the locking mechanism 1008 may engage mechanically with structures on the PCB. In one example, the terminal 1010 may have a spring mechanism configured to lock into a prepared opening in the housing 904. The locking mechanism 1008 may reduce disruptive impact to the a connection between the PCB and the terminal 1010 if tension applied externally to electrical wires of the PCB. The locking mechanism 1008 may secure the PCB within the inner cavity 1004 of the first portion 906 of the housing 904 to maintain the position of the PCB. In other words, the PCB may be locked in place so that the PCB does not slide or bounce within the housing 904. Furthermore, the locking mechanism 1008 may shield the PCB from external forces applied to the electrical wiring coupled to the PCB by, for example, other moving parts or flying debris.

In addition, the side walls 1006 of the first portion 906 of the housing 904 may each include one or more crush ribs 1014 to further aid in maintaining the position of the PCB. The crush ribs 1014 may be protrusions extending outwards from the side walls 1006 into the inner cavity 1004 of the first portion 906 of the housing 904. Each of the side walls 1006 may at least one and up to four, for example, of the crush ribs 1014 and may have differing numbers of crush ribs 101 per wall. The crush ribs 1014 may contact edges of the PCB via small points of contact (e.g., the contact points have small surface areas) and maintain the edges of the PCB spaced away from the inner walls 1006 of the first portion 906 of the housing 904.

A compression limiter 1020 may be coupled to one of the side walls 1006 of the first portion 906 of the housing 904. The compression limiter 1020 may be integral, e.g., continuous with, the sleeves 918 of the housing 904, as shown in FIG. 9, and extending from the same side wall 1006 as the sleeves 918. However, other examples, may include the compression limiter 1020 extending from a different side wall 1006 from the sleeves 918. The compression limiter 1020 includes an opening 1022 configured to receive a fastener, as described below with reference to FIG. 11.

The sensor assembly 902 may be coupled to an actuator component of an axle assembly, e.g., the actuator component 146 of FIGS. 4 and 5, to monitor a position and engagement of the actuator component relative to a stationary component of the axle assembly. As illustrated in FIG. 11, the sensor assembly 902 may be attached to a solenoid 1102. More specifically, a fastener 1106 may be inserted through the opening 1022 of the compression limiter 1020 to secure the sensor assembly 902 to the solenoid 1102. In one example, the fastener 1106 may be a screw. In other examples, the fastener 1106 may be any kind of fastening device.

The fastener 1106 may be inserted through the opening 1022 of the compression limiter 1020 of the housing 904 of the sensor assembly 902 to interface with the compression limiter 1020. The fastener 1106 may also be inserted into a corresponding aperture in a top plate 1108 of the solenoid 1102, the aperture configured to receive the fastener 1106. For example, the fastener 1106 and the aperture may each be adapted with matching threading. The fastener 1106 is shown inserted into a circumferential edge 1110 of the top plate 1108 but may be coupled to the top plate 1108 at other locations, in other examples. Upon tightening of the fastener 1106, e.g., with a tool such as a screwdriver, the sensor assembly 902 may be securely coupled to the top plate 1108.

The sensor assembly 902 may be coupled to the top plate 1108 so that a lower portion 1112, with respect to the z-axis, is positioned in front of a first planar surface 1114 of the top plate 1108 and overlaps with the first planar surface 1114. The first planar surface 1114 may be an external surface of the solenoid 1102, e.g., an outward-facing surface. For example, as shown in FIG. 11, a rear-facing surface of the lower portion 1112 of the sensor assembly 902 (e.g., a surface of the lower portion 1112 aligned with the z-x plane) is aligned with the first planar surface 1114 of the top plate 1108. In the arrangement depicted in FIG. 11, a target for the sensor assembly 902 may be positioned in front of the lower portion 1112 of the sensor assembly 902 along the y-axis. A distance between the sensor assembly 902 may be determined based on an eddy current signal generated by magnetic field interactions between the sensor assembly 902 and the target.

While the lower portion 1112 of the sensor assembly 902 may be aligned with the first planar surface 1114 of the top plate 1108 of the solenoid 1102, the lower portion 1112 may be spaced away from the first planar surface 1114. For example, the sensor assembly 902 may be fastened to the top plate 1108 so that a first gap is present between the lower portion of the sensor assembly 902 and the first planar surface 1114 along the y-axis. In one example, the gap may be 2.13-2.88 mm. A second gap may be present between a lower perimeter of the lower portion 1112 and the first planar surface 1114 along the z-axis to provide clearance between the solenoid 1102 and the sensor assembly 902. The second gap may accommodate differences in thermal expansion between the solenoid 1102 and the sensor assembly 902 and may be at least 0.435 mm, for example.

In some examples, as depicted in FIG. 11 the first planar surface 1114 of the top plate 1108 of the solenoid 1102 may be adapted with a recess 1116 with dimensions similar to dimensions of the lower portion 1112 of the sensor assembly 902 (e.g., a width along the x-axis, a height along the z-axis, and a depth along the y-axis). The recess 1116 may include a plurality of crush ribs 1118 disposed along surfaces of the recess 1116. The plurality of crush ribs 1118 may further secure the position of the sensor assembly 902 relative to the solenoid 1102 by enabling an interference fit between the lower portion 1112 of the sensor assembly 902 and the recess 1116 while maintaining the gap between the sensor assembly 902 and the first planar surface 1114 of the top plate 1108. In such an instance the gap may be between the rear-facing surface of the lower portion 1112 of the sensor assembly 902 and a front facing surface (e.g., a surface aligned with the z-x plane) of the recess 1116.

It will be appreciated that the coupling of the sensor assembly 902 to the solenoid 1102 shown in FIG. 11 is a non-limiting example of how the sensor assembly may be attached to the solenoid. Other examples may include various orientations of the sensor assembly relative to the solenoid. For example, the sensor assembly may be coupled to a bottom plate of the solenoid instead or may not overlap with the external surface of the top plate of the solenoid. Furthermore, other shapes and sizes of the sensor assembly have been contemplated. In addition, the sensor assembly may be implemented in systems with other types of differential apparatuses other than locking differentials, such as limited slip differentials, torque vectoring differentials, active differentials, etc.

An example of a routine 1300 for utilizing an eddy current sensor, such as the eddy current sensor depicted in FIGS. 6-11, is shown in FIG. 13. The eddy current sensor may be mechanically coupled to a solenoid, as illustrated in FIG. 11, electronically coupled to a microcontroller, and configured to adjust a position of a locking gear of a locking differential for an axle assembly, such as the axle assembly 100 shown in FIGS. 2-5. The locking gear is adjustable between a first position where the locking gear engages the locking differential, and a second position where the locking gear is disengaged from the locking differential. The axle assembly may be coupled to at least one of a rear axle and a front axle of the vehicle. Instructions for carrying out method 1300 and the rest of the methods included herein may be executed by a vehicle controller, such as controller 40 of FIG. 1, based on instructions stored on a memory of the controller and in conjunction with signals received from sensors of the vehicle, such as the eddy current sensor and the wheel speed sensor 20 shown in FIG. 1. The controller may employ engine actuators of the engine system to adjust engine operation, according to the methods described below.

At 1302, the routine includes estimating and/or measuring current engine operating conditions. For example, engine speed, engine torque, wheel speed, etc. may be determined based on input from various sensors of the vehicle. The routine further includes determining if engagement of the locking differential to increase wheel traction by locking axle half shafts to one another is demanded at 1304. Engaging the locking differential may be requested, in one example, when the locking differential is an automatic locking differential and loss of traction is detected at one or more wheels of the vehicle, e.g., by an application of torque, such as when turning a corner, is inferred by a dynamometer receiving data regarding rotational speed of the wheel measured by the wheel speed sensor. The controller may automatically command engagement of the locking differential when loss of traction is indicated.

In another example, the locking differential may be a manually-activated locking differential. Engagement of the locking differential may be indicated by an operator pressing a button or switch on a dashboard of the vehicle or by manipulating a gearstick. The operator may choose actuation of the locking differential into a locked position when wheel slippage is observed by the operator. Alternatively, the operator may engage the locking differential in anticipation of travel over uneven, loose, or slippery terrain.

If the demand for engaging the locking differential is not detected, the routine proceeds to 1306 to continue vehicle operation under the current conditions. The routine returns to the start. If the demand for engaging the locking differential is detected, the routine continues to 1308 to determine if the locking gear is currently in the first position, e.g., the locking gear engages the locking differential and axle half shafts are locked together and rotating in unison. The position of the locking gear may be evaluated by activating the eddy current sensor. Activating the eddy current sensor may include directing a flow of current through a magnetic core of the eddy current sensor and measuring a resulting signal as a function of time. Variations in the signal may be directly correlated to distance between a target and the magnetic core of the eddy current sensor. The distance between the target and the magnetic core may be compared to, for example, a look-up table stored in the memory of the controller correlating the distance between the target and the magnetic core to a distance between the locking gear and a differential housing of the locking differential, and therefore the position of the locking gear. When the locking gear is in the first position, the distance between a magnetic core of the eddy current sensor and the target may be below a threshold distance, the locking gear and the locking differential are engaged and the locking differential is in a locked state. Conversely, when the distance is above the threshold distance, the locking gear may be in the second position and the locking differential is in an unlocked state.

Based on input from the eddy current sensor, if the locking gear is determined to already be in the first position, the routine returns to 1306 to continue operating the vehicle under the current conditions. The routine returns to the start.

If the locking gear is not in the first position, the routine proceeds to 1310 to activate the actuator assembly to adjust the locking gear to the first position. Adjusting the locking gear to the first position includes energizing the solenoid to generate a magnetic field that causes the solenoid to drive axial movement of the locking gear to engage with the locking differential. The engagement of the locking gear with the locking differential locks the two halves of the axle to one another to rotate as a unit.

In addition, in some examples, the adjustment of the locking gear to the first position may be confirmed after 1310. In such instances, if the locking gear is determined to not be in the first position, even after activation of the actuator assembly, the routine may include indicating an issue with adjusting the locking differential to the locked state by, for example, illuminating a diagnostic code on a dashboard of the vehicle.

At 1312, the routine determines if a request to disengage the locking gear from the locking differential is requested. Disengaging the locking differential may be requested, in one example, when the locking differential is configured as the automatic locking differential and a decrease in applied torque and/or increase in traction is detected at one or more wheels of the vehicle that are locked to one another via the locking differential due to, for example, a change in ground conditions. The decrease in applied torque and/or increase in traction may be inferred by the dynamometer, receiving information from the wheel sensors. The controller may automatically command disengagement of the locking differential as a result.

In another example, the locking differential may be the manually-activated locking differential. Disengagement of the locking differential may be indicated by an operator pressing the button or switch on the dashboard of the vehicle or by manipulating a gearstick. The operator may choose actuation of the locking differential into the unlocked position when the operator determines that the terrain does not demand the additional wheel torque provided by the locking differential. e.g., the vehicle is navigating a hard, packed, even surface.

If the request for disengaging the locking gear from the locking differential is not detected, the routine returns to 1310 to continue operating the vehicle with the locking gear in the first position, engaging the locking differential. Alternatively, if the request for disengagement is detected, the routine continues to 1314 to deactivate the actuator assembly. For example, the solenoid may be de-energized, allowing the locking gear to slide axially to the second position, thereby disengaging the locking differential. The locking differential is adjusted to the unlocked state and when the solenoid is de-energized and the axle shafts rotate independently.

The position of the locking gear is confirmed at 1316 by activating the eddy current sensor, as described above. Activating the eddy current sensor may include directing current flow through the magnetic core of the eddy current sensor and measuring the resulting signal as a function of time. When the distance is above the threshold distance, the locking gear may be in the second position and the locking differential is in the unlocked state.

If the locking gear is not determined to be in the second position, the routine returns to 1314 to reaffirm deactivation of the actuator assembly. Alternatively, in some examples, the controller may indicate an issue with deactivating the actuator assembly by, for example, illuminating a diagnostic code on the dashboard of the vehicle. If the locking gear is confirmed to be in the second position, the routine proceeds to 1306 to continue vehicle operation under current conditions. The routine returns to the start.

In this way, a low cost, robust sensor assembly may accurately determine a status of a locking differential. The sensor assembly may rely on magnetic interactions and may located in a variety of positions relative to a locking gear of the locking differential. The magnetic properties of the sensor assembly allow the sensor assembly to operate without direct contact with the locking differential and may therefore be less prone to wear and degradation and highly tolerant to temperature fluctuations, large distances, and large magnetic fields. By incorporating a microcontroller in the sensor assembly, the sensor assembly may correct for temperature variations and executable instructions and other data stored in a memory of the microcontroller may be continually updated without dissembling the sensor assembly. Furthermore, issues with operation of the locking gear may be readily detected by the sensor assembly and relayed rapidly to an operator.

The technical effect of implementing an eddy current sensor in an actuating assembly of a differential apparatus is that a status of the differential apparatus may be accurately determined over a wide range of operating conditions.

FIGS. 1-7 and 9-11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one embodiment, a sensor assembly includes an eddy current sensor communicatively coupled to a microcontroller and configured to detect a distance between an axially slidable component and an axially stationary component of a differential apparatus. In a first example of the sensor assembly, the eddy current sensor is coupled to an actuator component of a locking differential. A second example of the sensor assembly optionally includes the first example, and further includes wherein the eddy current sensor includes a ferrite core coupled to a printed circuit board has coil windings etched into a surface of the circuit board and wherein the printed circuit board includes the microcontroller. A third example of the sensor assembly optionally includes one or more of the first and second examples, and further includes, wherein the ferrite core includes protruberances extending towards a target of the sensor assembly and wherein the coil windings of the printed circuit board surround at least one of the protruberances of the ferrite core. A fourth example of the sensor assembly optionally includes one or more of the first through third examples, and further includes, wherein the target is spaced away from the protruberances of the ferrite core by a gap and wherein the target is formed from a conductive material. A fifth example of the sensor assembly optionally includes one or more of the first through fourth examples, and further includes, wherein the eddy current sensor is enclosed within a housing formed of a rigid, durable, and non-magnetic material, the housing having sealing engagement with components of the eddy current sensor to inhibit exchange of fluids between outside the housing and inside the housing. A sixth example of the sensor assembly optionally includes one or more of the first through fifth examples, and further includes, wherein the housing includes a first portion and a second portion, the first portion and second portion configured to be sealingly coupled to one another, and wherein the second portion of the housing is positioned between the eddy sensor and the target. A seventh example of the sensor assembly optionally includes one or more of the first through sixth examples, and further includes, wherein the housing includes sleeves extending from the first portion of the housing, the sleeves configured to enclose electrical connectors and block ingress of oil into the housing through the sleeves.

In another embodiment, an axle assembly includes, a differential apparatus, a locking assembly configured to slide axially to engage with the differential apparatus, the locking assembly including an actuator and a locking gear, a sensor assembly coupled to the locking assembly, the sensor assembly configured to measure a distance between the locking assembly and the differential apparatus based on magnetic interactions. In a first example of the axle assembly, the actuator is a solenoid and the sensor assembly is coupled to a top plate of the solenoid with a portion of the sensor assembly overlapping and parallel with an external planar surface of the top plate. A second example of the axle assembly optionally includes the first example, and further includes wherein the sensor assembly includes an eddy current sensor and a microcontroller and wherein the eddy current sensor is configured to measure a distance between a magnetic core of the eddy current sensor and a target spaced away from the magnetic core. A third example of the axle assembly optionally includes one or more of the first and second examples, and further includes, wherein the target is a conductive plate coupled to a casing of the differential apparatus. A fourth example of the axle assembly optionally includes one or more of the first through third examples, and further includes, wherein the target is a portion of a casing of the differential apparatus aligned with the sensor assembly along an axial direction. A fifth example of the axle assembly optionally includes one or more of the first through fourth examples, and further includes, wherein the eddy current sensor has a capacitor, a first resistor, a second resistor, a voltage source, and an electronically controlled semiconductor switching device, the switching device including a first switch, a second switch, and a third switch and wherein the first switch is configured to control a sourcing of a current flow to a sensor coil of the eddy current sensor, the second switch is configured to control a return of the current flow to the sensor coil and the capacitor and the third switch is configured to control current flow through the sensor coil of the eddy current sensor to a voltage source return. A sixth example of the axle assembly optionally includes one or more of the first through fifth examples, and further includes, wherein a voltage of the eddy current sensor is measured in a circuit branch parallel with the sensor coil. A seventh example of the axle assembly optionally includes one or more of the first through sixth examples, and further includes, wherein the microcontroller is an 8-bit microcontroller configured to control the switching device and capture and convert a signal from eddy current sensor into a pulse width modulated output with a duty cycle proportional to the measured voltage of the eddy current sensor. An eighth example of the axle assembly optionally includes one or more of the first through seventh examples, and further includes, wherein the voltage measured by the eddy current sensor is corrected for temperature fluctuations by opening the third switch while measuring the voltage and subtracting the measured voltage while the third switch is opened from the voltage measured while the third switch is closed.

In yet another embodiment, a method includes, responsive to a request for increased wheel traction, activating an eddy current sensor to determine a distance between a locking gear and a differential apparatus, adjusting the position of the locking gear to a first position to couple the locking gear to the differential apparatus, and responsive to a request for decreased wheel traction, adjusting the position of the locking gear to a second position to decouple the locking gear from the differential apparatus, and activating the eddy current sensor to determine the distance between the locking gear and the differential apparatus to confirm decoupling of the locking gear from the differential apparatus. In a first example of the method, adjusting the position of the locking gear to the first position includes energizing an actuator of the locking gear and adjusting the position of the locking gear to the second position includes de-energizing the actuator. A second example of the method optionally includes the first example, and further includes, wherein activating the eddy current sensor includes flowing a current through a magnetic core of the eddy current sensor, monitoring an interaction between a magnetic field generated at the eddy current sensor and an inductance caused by eddy currents generated at a target spaced away from the eddy current sensor, and inferring the distance between the locking gear and the differential apparatus based on the interaction and wherein the target is coupled to the differential apparatus.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A sensor assembly, comprising:
   an eddy current sensor communicatively coupled to a microcontroller and configured to detect a distance between an axially slidable component and an axially stationary component of a differential apparatus, wherein the eddy current sensor is enclosed within an outer housing, the outer housing directly coupled to the axially slidable component and overlapping with an external surface of the axially slidable component, wherein the outer housing is coupled to an actuator of a locking differential and wherein the actuator is included in the axially slidable component, and wherein an innermost radial portion of the outer housing is spaced away from the axially slidable component.

2. The sensor assembly of claim 1, wherein the eddy current sensor includes a ferrite core coupled to a printed circuit board having coil windings etched into a surface of the printed circuit board and wherein the printed circuit board includes the microcontroller.

3. The sensor assembly of claim 2, wherein the ferrite core includes protuberances extending towards a target of the sensor assembly and wherein the coil windings of the printed circuit board surround at least one of the protuberances of the ferrite core.

4. The sensor assembly of claim 3, wherein the target is spaced away from the protuberances of the ferrite core by a gap and wherein the target is formed from a conductive material.

5. The sensor assembly of claim 4, wherein the outer housing is formed of a rigid, durable, and non-magnetic material, the outer housing having sealing engagement with components of the eddy current sensor to inhibit exchange of fluids between outside the outer housing and inside the outer housing.

6. The sensor assembly of claim 5, wherein the outer housing includes a first portion and a second portion, the first portion and second portion configured to be sealingly coupled to one another, and wherein the second portion of the outer housing is positioned between the eddy current sensor and the target.

7. The sensor assembly of claim 5, wherein the outer housing includes sleeves extending from a first portion of the outer housing, the sleeves configured to enclose electrical connectors and block ingress of oil into the outer housing through the sleeves.

8. An axle assembly, comprising:
   a differential apparatus;
   a locking assembly configured to slide axially to engage with the differential apparatus, the locking assembly being axially slidable and including an actuator and a locking gear; and
   a sensor assembly enclosed within an outer housing, the outer housing directly coupled to the actuator of the locking assembly, the sensor assembly configured to measure a distance between the locking assembly and the differential apparatus based on magnetic interactions,
   wherein the outer housing is coupled to and overlaps with an external surface of the actuator, and wherein an innermost radial portion of the outer housing is spaced away from the actuator.

9. The axle assembly of claim 8, wherein the actuator is a solenoid and the sensor assembly is coupled to a top plate of the solenoid with a portion of the sensor assembly overlapping and parallel with an external planar surface of the top plate, and wherein the solenoid includes a recess.

10. The axle assembly of claim 8, wherein the sensor assembly includes an eddy current sensor and a microcontroller and wherein the eddy current sensor is configured to measure a distance between a magnetic core of the eddy current sensor and a target spaced away from the magnetic core.

11. The axle assembly of claim 10, wherein the target is a conductive plate coupled to a casing of the differential apparatus.

12. The axle assembly of claim 10, wherein the target is a portion of a casing of the differential apparatus aligned with the sensor assembly along an axial direction.

13. The axle assembly of claim 10, wherein the eddy current sensor has a capacitor, a first resistor, a second resistor, a voltage source, and an electronically controlled semiconductor switching device, the switching device including a first switch, a second switch, and a third switch and wherein the first switch is configured to control a sourcing of a current flow to a sensor coil of the eddy current sensor, the second switch is configured to control a return of the current flow to the sensor coil and the capacitor, and the third switch is configured to control current flow through the sensor coil of the eddy current sensor to a voltage source return.

14. The axle assembly of claim 13, wherein a voltage of the eddy current sensor is measured in a circuit branch parallel with the sensor coil.

15. The axle assembly of claim 14, wherein the microcontroller is an 8-bit microcontroller configured to control the switching device and capture and convert a signal from the eddy current sensor into a pulse width modulated output with a duty cycle proportional to the measured voltage of the eddy current sensor.

16. The axle assembly of claim 15, wherein the voltage measured by the eddy current sensor is corrected for temperature fluctuations by opening the third switch while measuring the voltage and subtracting the measured voltage while the third switch is opened from the voltage measured while the third switch is closed.

17. A method for an axle assembly, comprising:
responsive to a request for increased wheel traction,
activating an eddy current sensor to determine a distance between a locking gear and a differential apparatus;
adjusting a position of the locking gear to a first position to couple the locking gear to the differential apparatus; and
responsive to a request for decreased wheel traction,
adjusting the position of the locking gear to a second position to decouple the locking gear from the differential apparatus; and
activating the eddy current sensor to determine the distance between the locking gear and the differential apparatus to confirm decoupling of the locking gear from the differential apparatus,
wherein the eddy current sensor is enclosed within an outer housing, the outer housing directly coupled to an actuator of the locking gear and overlaps with an external surface of the actuator, the actuator is included in the locking gear, and wherein an innermost radial portion of the outer housing is spaced away from the actuator.

18. The method of claim 17, wherein adjusting the position of the locking gear to the first position includes energizing the actuator of the locking gear and adjusting the position of the locking gear to the second position includes de-energizing the actuator.

19. The method of claim 18, wherein activating the eddy current sensor includes flowing a current through a magnetic core of the eddy current sensor, monitoring an interaction between a magnetic field generated at the eddy current sensor and an inductance caused by eddy currents generated at a target spaced away from the eddy current sensor, and inferring the distance between the locking gear and the differential apparatus based on the interaction and wherein the target is coupled to the differential apparatus.

* * * * *